(12) United States Patent
Wilson

(10) Patent No.: US 7,450,470 B2
(45) Date of Patent: Nov. 11, 2008

(54) HIGH RESOLUTION IMAGES FROM REFLECTED WAVE ENERGY

(75) Inventor: Douglas James Wilson, Port Coquitlam (CA)

(73) Assignee: Imagenex Technology Corp., Port Coquitlam, British Columbia (CA)

( * ) Notice: Subject to any disclaimer, the term of this patent is extended or adjusted under 35 U.S.C. 154(b) by 850 days.

(21) Appl. No.: 11/034,628

(22) Filed: Jan. 12, 2005

(65) Prior Publication Data

US 2006/0013069 A1 Jan. 19, 2006

Related U.S. Application Data

(63) Continuation-in-part of application No. 10/891,655, filed on Jul. 15, 2004, now Pat. No. 7,212,466.

(51) Int. Cl.
G03B 42/06 (2006.01)
(52) U.S. Cl. .............................. 367/68; 367/7; 367/111
(58) Field of Classification Search ..................... 367/7, 367/68, 111; 342/179
See application file for complete search history.

(56) References Cited

U.S. PATENT DOCUMENTS

| 4,030,062 A | 6/1977 | Diehl et al. |
| 4,170,766 A | 10/1979 | Pridham et al. |
| 4,190,818 A | 2/1980 | Follin et al. |
| 4,237,737 A | 12/1980 | Nitadori ..................... 73/625 |
| 4,290,127 A | 9/1981 | Pridham et al. |
| 4,686,532 A | 8/1987 | McAulay |
| 4,688,045 A | 8/1987 | Knudsen |
| 4,817,614 A | 4/1989 | Hassler et al. |
| 5,216,640 A | 6/1993 | Donald et al. |
| 5,349,524 A | 9/1994 | Daft et al. ..................... 367/7 |

(Continued)

FOREIGN PATENT DOCUMENTS

JP 62082379 A 4/1987

(Continued)

OTHER PUBLICATIONS

Urick, Robert J., *Principles of underwater sound*, 3rd ed., 1983, p. 65-68, McGraw-Hill Inc., New York.

(Continued)

*Primary Examiner*—Ian J. Lobo
(74) *Attorney, Agent, or Firm*—Woodcock Washburn LLP

(57) ABSTRACT

A process and apparatus for producing signals for controlling a display to produce an image in an imaging system employing a plurality of transducers. First and second beam signals are produced in response to delayed channel signals associated with respective transducers, the delayed channel signals representing real and imaginary components of time domain signals associated with respective transducers suitably delayed to focus a receive beam pattern of the transducers at a beam angle, each of the first and second beam signals including separate real and imaginary component representations. The real and imaginary components of the first and second beam signals are combined to produce a composite beam signal, the composite beam signal including separate real and imaginary component representations. A trigonometric expansion is performed on normalized values of the real and imaginary component representations of the composite beam signal to produce a plurality of expanded values and illumination signals are produced in response to the expanded values, for illuminating pixels on the display.

65 Claims, 12 Drawing Sheets

U.S. PATENT DOCUMENTS

| | | | |
|---|---|---|---|
| 5,619,998 | A | 4/1997 | Abdel-Malek et al. |
| 5,647,365 | A | 7/1997 | Abboud |
| 5,793,703 | A * | 8/1998 | Shippey .................... 367/7 |
| 5,822,276 | A | 10/1998 | Miklovic |
| 5,886,951 | A | 3/1999 | Wagstaff et al. |
| 6,088,295 | A | 7/2000 | Altes |
| 6,130,641 | A | 10/2000 | Kraeutner et al. .......... 342/179 |
| 6,485,423 | B2 | 11/2002 | Angelsen et al. |
| 6,509,871 | B2 | 1/2003 | Bevington |
| 6,624,783 | B1 | 9/2003 | Rabideau |
| 6,654,315 | B1 | 11/2003 | Carter et al. |
| 6,784,835 | B2 | 8/2004 | Kohno et al. |

FOREIGN PATENT DOCUMENTS

| | | |
|---|---|---|
| WO | WO 97/04334 A1 | 2/1997 |

OTHER PUBLICATIONS

Texas Instruments TMS320C3x Gemeral-Purpose Applications User's Guide, Literature No. SPRU194, Jan. 1998, pp. 6-80 to 6-101, Texas Instruments Incorporated, U.S.A.

G. Blacquiere et al., "Multibeam Echosounding: Beamforming versus Interferometry" (Mar. 1998) Oceanology International.

C.D. Loggins, "Ahead-Look Sonars:Design Comparisons and Performance Considerations" (Jul./Aug. 1995) Underwater Systems Design.

\* cited by examiner

| DEPTH RANGE | DELTA FREQUENCY | REFERENCE FREQUENCY | SAMPLING FREQUENCY | CUTOFF FREQUENCY | PING LENGTH |
|---|---|---|---|---|---|
| 5 m | 30.46875 kHz | 350.46875 kHz | 75.0 kHz | 34.0 kHz | 30 μSec |
| 10 m | 15.234 kHz | 335.234 kHz | 37.5 kHz | 17.0 kHz | 60 μSec |
| 40 m | 3.80859 kHz | 323.80859 kHz | 9.375 kHz | 4.25 kHz | 240 μSec |
| 100 m | 1.5234 kHz | 321.5234 kHz | 3.75 kHz | 1.7 kHz | 600 μSec |

HIGH RESOLUTION IMAGES FROM REFLECTED WAVE ENERGY

CROSS-REFERENCE TO RELATED APPLICATIONS

This application is a continuation-in-part of U.S. patent application Ser. No. 10/891,655, filed Jul. 15, 2004, now U.S. Pat. No. 7,212,466.

BACKGROUND OF THE INVENTION

1. Field of Invention

This invention relates to imaging systems based on receiving reflected wave energy and more particularly to apparatus, methods, media and signals for producing high resolution images from reflected wave energy.

2. Description of Related Art

Imaging systems based on receiving reflected wave energy conventionally employ electromagnetic waves or acoustic waves to produce a reflected signal from a distant object. This reflected signal is interpreted and used to produce a display image. Various techniques may be used to interpret the reflected signal.

Many systems involve the use of a plurality of transducers arranged and configured in a transducer array. Each transducer produces a signal in response to reflected wave energy and each signal is processed to produce a focusing effect whereby the array appears to receive reflected wave energy in a steerable beam. Through suitable processing of the signals received from the transducers in the array this steerable beam can be swept through a plurality of angles to scan an area in which reflected wave energy is present.

Transducer arrays can be costly however, and require significant processing capability to adequately process signals from each transducer element to ultimately produce an image.

SUMMARY OF THE INVENTION

In accordance with one aspect of the invention, there is provided a process for producing signals for controlling a display to produce an image in an imaging system employing a plurality of transducers. The process involves producing first and second beam signals in response to delayed channel signals associated with respective transducers. The delayed channel signals represent real and imaginary components of time domain signals associated with respective transducers suitably delayed to focus a receive beam pattern of the transducers at a beam angle. Each of the first and second beam signals includes separate real and imaginary component representations. The process further involves combining the real and imaginary components of the first and second beam signals, to produce a composite beam signal, the composite beam signal including separate real and imaginary component representations. The process further involves performing a trigonometric expansion on normalized values of the real and imaginary component representations of the composite beam signal to produce a plurality of expanded values and producing illumination signals in response to the expanded values, for illuminating pixels on the display.

The process may involve receiving the delayed channel signals.

The process may involve producing the delayed channel signals.

The delayed channel signals may comprise producing the delayed channel signals in response to channel signals and delay signals associated with the respective transducers.

Each channel signal may represent a signal received at a corresponding transducer and include separate real and imaginary component representations and the delay signals may include separate cosine and sine delay components of a delay dependent on a desired beam angle at which the transducers are to be focused. Each of the delayed channel signals may include separate real and imaginary component representations.

The process may further include receiving the channel signals.

The process may further include producing the channel signals.

The channel signals may comprise producing frequency domain representations of respective time sampled representations of respective signals received at respective transducers and producing time domain representations of the respective signals in response to the frequency domain representations, the time domain representations comprising real and imaginary components.

The process may further include receiving the delay signals.

The process may further include receiving the channel signals and the delay signals may be received before the channel signals are received.

The process may further include producing the delay signals.

The process may further include receiving the channel signals and the delay signals may be produced before the channel signals are received.

Producing the delay signals may comprise producing the delay signals in response to transducer spacing, angular frequency of wave energy received at the transducers, desired beam angle and speed of the wave energy in an area of a medium for which the image is to be produced.

The process may further include producing a normalized composite beam signal comprising a plurality of normalized values, in response to the real and imaginary component representations of the composite beam signal and for each of the normalized values calculating a real part of the product of the first beam signal and the complex conjugate of the second beam signal.

Producing a normalized composite beam signal may comprise scaling the real part of a product of the first beam signal and a complex conjugate of the second beam signal, by a magnitude value.

The process may further include producing the magnitude value in response to the real and imaginary components of the first and second beam signals.

Performing a trigonometric expansion may comprise performing a power expansion on each of the normalized values.

Performing a trigonometric expansion may comprise performing a sum of Chebyshev polynomials on each of the normalized values.

The process may further include illuminating pixels on the display in response to the illumination signals.

The process may involve conducting the process above and/or variations thereof for each of a plurality of beam angles to produce a set of illumination signals for each the beam angle.

The process may further include defining the plurality of beam angles.

The process may further include mapping respective sets of illumination values to respective rays of pixels on the display, each the ray corresponding to a respective beam angle, the illumination signals being operable to cause pixels along a given ray to be illuminated in response to corresponding illumination values.

In accordance with another aspect of the invention, there is provided a computer readable medium encoded with instructions for directing a processor to execute the process above.

In accordance with another aspect of the invention, there is provided a computer readable signal encoded with instructions for directing a processor to execute the process above.

In accordance with another aspect of the invention, there is provided an apparatus for producing signals for controlling a display to produce an image in an imaging system employing a plurality of transducers. The apparatus includes provisions for producing first and second beam signals in response to delayed channel signals associated with transducers, the delayed channel signals representing real and imaginary components of time domain signals associated with respective transducers suitably delayed to focus a receive beam pattern of the transducers at a beam angle, each of the first and second beam signals including separate real and imaginary component representations. The apparatus further includes provisions for combining the real and imaginary components of the first and second beam signals, to produce a composite beam signal, the composite beam signal including separate real and imaginary component representations, provisions for performing a trigonometric expansion on normalized values of the real and imaginary component representations of the composite bean signal to produce a plurality of expanded values and provisions for producing illumination signals, in response to the expanded values, the illumination signals being operable to be received by the display for illuminating pixels on the display.

The apparatus may further include provisions for receiving the delayed channel signals.

The apparatus may further include provisions for producing the delayed channel signals.

The provisions for producing the delayed channel signals may comprise provisions for producing the delayed channel signals in response to channel signals and delay signals associated with the transducers, Each channel signal may represent a signal received at a corresponding transducer and may include separate real and imaginary component representations and the delay signals may include separate cosine and sine delay components of a delay dependent on a desired beam angle at which the transducers are to be focused. Each of the delayed channel signals may include separate real and imaginary component representations.

The apparatus may further include provisions for receiving the channel signals.

The apparatus may further include provisions for producing the channel signals.

The provisions for producing the channel signals may comprise provisions for producing frequency domain representations of respective time sampled representations of respective signals received at respective transducers and provisions for producing time domain representations of the respective signals in response to the frequency domain representations. The time domain representations may comprise real and imaginary components.

The apparatus may further include provisions for receiving the delay signals.

The apparatus may further include provisions for receiving the channel signals and the delay signals may be received before the channel signals are received.

The apparatus may further include provisions for producing the delay signals.

The apparatus may further include provisions for receiving the channel signals and the delay signals may be produced before the channel signals are received.

The provisions for producing the delay signals may comprise provisions for producing the delay signals in response to transducer spacing, angular frequency of wave energy received at the transducers, desired beam angle and speed of the wave energy in an area of a medium for which the image is to be produced.

The apparatus may further include provisions for producing a normalized composite beam signal comprising a plurality of normalized values in response to the real and imaginary component representations of the composite beam signal and the provisions for producing a normalized composite beam signal may include provisions for, for each of the normalized values, calculating a real part of the product of the first beam signal and a complex conjugate of the second beam signal.

The provisions for normalizing may comprise provisions for scaling the real part of a product of the first beam signal and the complex conjugate of the second beam signal, by a magnitude value.

The apparatus may further include provisions for producing the magnitude value in response to the real and imaginary components of the first and second beam signals.

The provisions for performing a trigonometric expansion may comprise provisions for performing a power expansion on each of the normalized values.

The provisions for performing a trigonometric expansion may comprise provisions for performing a sum of Chebyshev polynomials on each of the normalized values.

The apparatus may further include provisions for illuminating pixels on the display in response to the expanded values.

The apparatus may further include provisions for causing the apparatus to produce a set of illumination signals for a plurality of the beam angles.

The apparatus may further include provisions for defining the plurality of beam angles.

The apparatus may further include provisions for mapping respective sets of illumination values to respective rays of pixels on the display, each of the rays corresponding to a respective beam angle, the illumination signals being operable to cause pixels along a given ray to be illuminated in response to corresponding illumination values.

In accordance with another aspect of the invention, there is provided an apparatus for producing signals for controlling a display to produce an image in an imaging system employing a plurality of transducers. The apparatus includes memory for storing delayed channel signals associated with respective transducers, the delayed channel signals representing real and imaginary components of time domain signals associated with respective transducers suitably delayed to focus a receive beam pattern of the transducers at a beam angle. The apparatus further includes a processor in communication with the memory and operably configured to produce first and second beam signals in response to the delayed channel signals, each of the first and second beam signals including separate real and imaginary component representations. The processor is further operably configured to combine the real and imaginary components of the first and second beam signals, to produce a composite beam signal, the composite beam signal including separate real and imaginary component representations, perform a trigonometric expansion on normalized values of the real and imaginary component representations of the composite beam signal to produce a plurality of expanded values and produce illumination signals in response to the expanded values, for use by the display, for illuminating pixels on the display.

The apparatus may further include an input operably coupled to the processor for receiving the delayed channel signals.

The processor may be operably configured to produce the delayed channel signals.

The apparatus may further include memory for storing channel signals and delay signals associated with the respective transducers, each channel signal representing a signal received at a corresponding transducer and including separate real and imaginary component representations, and the delay signals including separate cosine and sine delay components of a delay dependent on a desired beam angle at which the transducers are to be focused, and the processor may be operably configured to produce the delayed channel signals in response to the channel signals and delay signals, each of the delayed channel signals including separate real and imaginary component representations.

The apparatus may further include an input coupled to the processor for receiving the channel signals.

The processor may be operably configured to produce the channel signals.

The apparatus may further include an input operably coupled to the processor to enable the processor to receive and store in the memory respective time sampled representations of respective signals received at respective transducers and the processor may be operably configured to produce the channel signals by producing frequency domain representations of respective time sampled representations of respective signals received at respective transducers and to produce time domain representations of the respective signals in response to the frequency domain representations, the time domain representations comprising real and imaginary components.

The apparatus may further include an input operably coupled to the processor to enable the processor to receive and store in the memory the delay signals.

The apparatus may further include an input operably coupled to the processor to enable the processor to receive the channel signals and wherein the delay signals may be received before the channel signals are received.

The processor may be operably configured to produce the delay signals.

The apparatus may further include an input operably coupled to the processor for receiving the channel signals and the processor may be operably configured to produce the delay signals before the channel signals are received.

The apparatus may further include memory for storing representations of transducer spacing, angular frequency of wave energy received at the transducers, desired beam angle and speed of the wave energy in an area of a medium for which the image is to be produced, and the processor may be operably configured to produce the delay signals in response to the representations of transducer spacing, angular frequency of wave energy received at the transducers, desired beam angle and speed of the wave energy in an area of a medium for which the image is to be produced.

The processor may be operably configured to produce a normalized composite beam signal comprising a plurality of normalized values in response to the real and imaginary component representations of the composite beam signal and for each of the normalized values, calculating a real part of a product of the first beam signal and a complex conjugate of the second beam signal.

The processor may be operably configured to scale the real part of the product of the first beam signal and the complex conjugate of the second beam signal, by a magnitude value.

The processor may be operably configured to produce the magnitude value in response to the real and imaginary components of the first and second beam signals.

The processor may be operably configured to perform the trigonometric expansion by performing a power expansion on each of the normalized values.

The processor may be operably configured to perform the trigonometric expansion by performing a sum of Chebyshev polynomials on each of the normalized values.

The processor may be operably configured to produce illumination signals operable to be received by an LCD display.

The processor may be operably configured to, for each of a plurality of beam angles, produce a set of illumination signals for each beam angle.

The processor may be operably configured to define the plurality of beam angles.

The processor may be operably configured to map respective sets of illumination values to respective rays of pixels on the display, each the ray corresponding to a respective beam angle, the illumination signals being operable to cause pixels along a given ray to be illuminated in response to corresponding illumination values.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
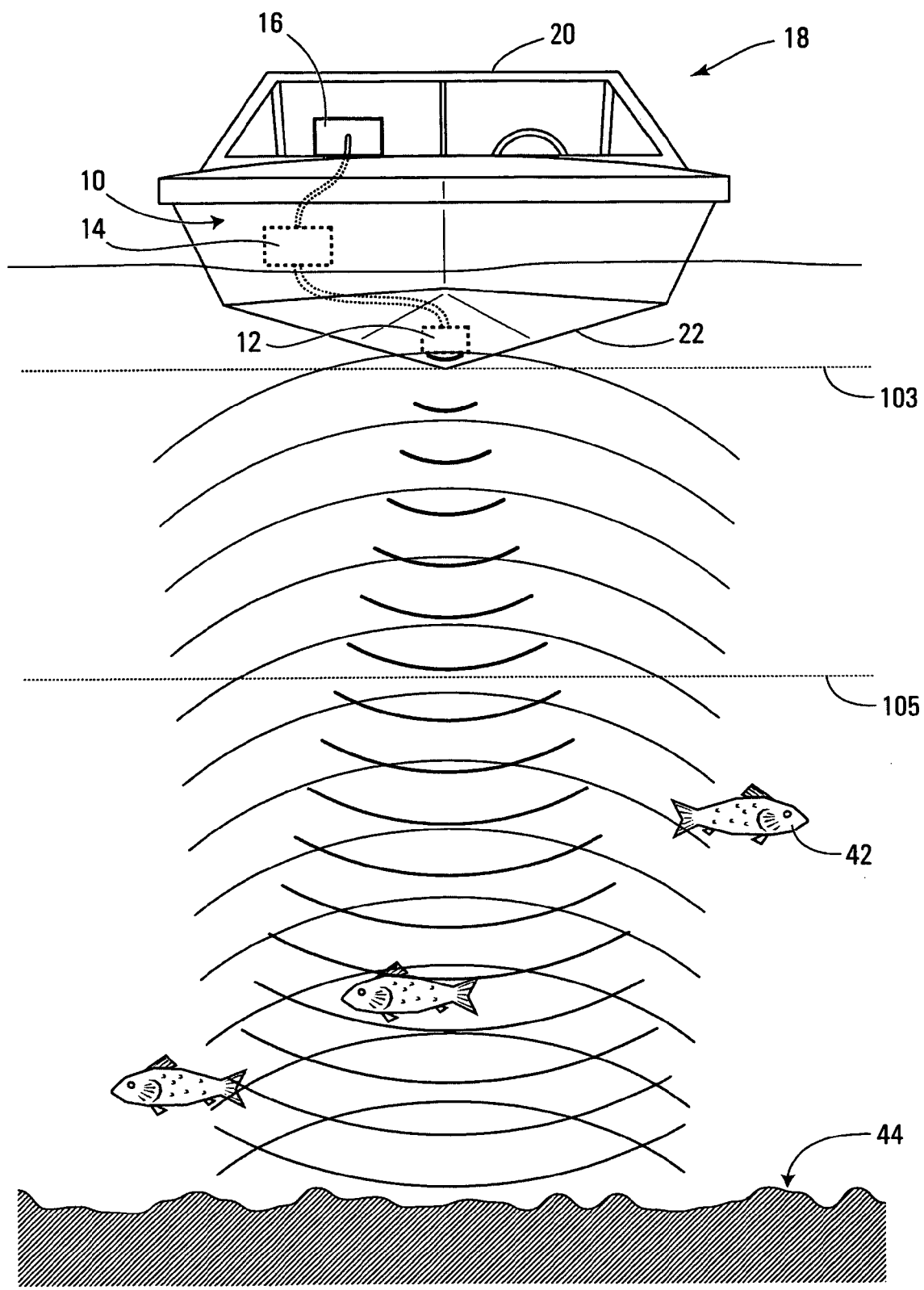
FIG. 1 is a schematic representation of an imaging system according to a first embodiment of the invention.

Referring to FIG. 1, an imaging system according to a first embodiment of the invention is shown generally at 10. In this embodiment, the system includes a sonar imaging system having a sonar transducer unit 12 and a remotely located processor 14 having a display 16. It will be appreciated that while the embodiment described is a sonar imaging system, the processes described herein may alternatively be used with electromagnetic energy systems, or other acoustic energy systems.

In the system of the embodiment described, the remotely located processor 14 may be mounted on a boat 18 in a wheelhouse 20 thereof, for example and the sonar transducer unit 12 may be secured to the hull 22 of the boat 18 or may be towed behind, for example. In general, the processor 14 controls the sonar transducer unit 12 causing it to produce and receive sonar signals and send signals representing the sonar signals to the processor 14 for processing to produce a display image on the display 16, indicating underwater elements such as fish 42 or an ocean bottom 44, for example, that have reflected the sonar signals produced by the sonar transducer unit 12. The display image is produced by using the process and apparatus described herein to calculate illumination values for each pixel within a field of view represented by the display.

Figure 2:
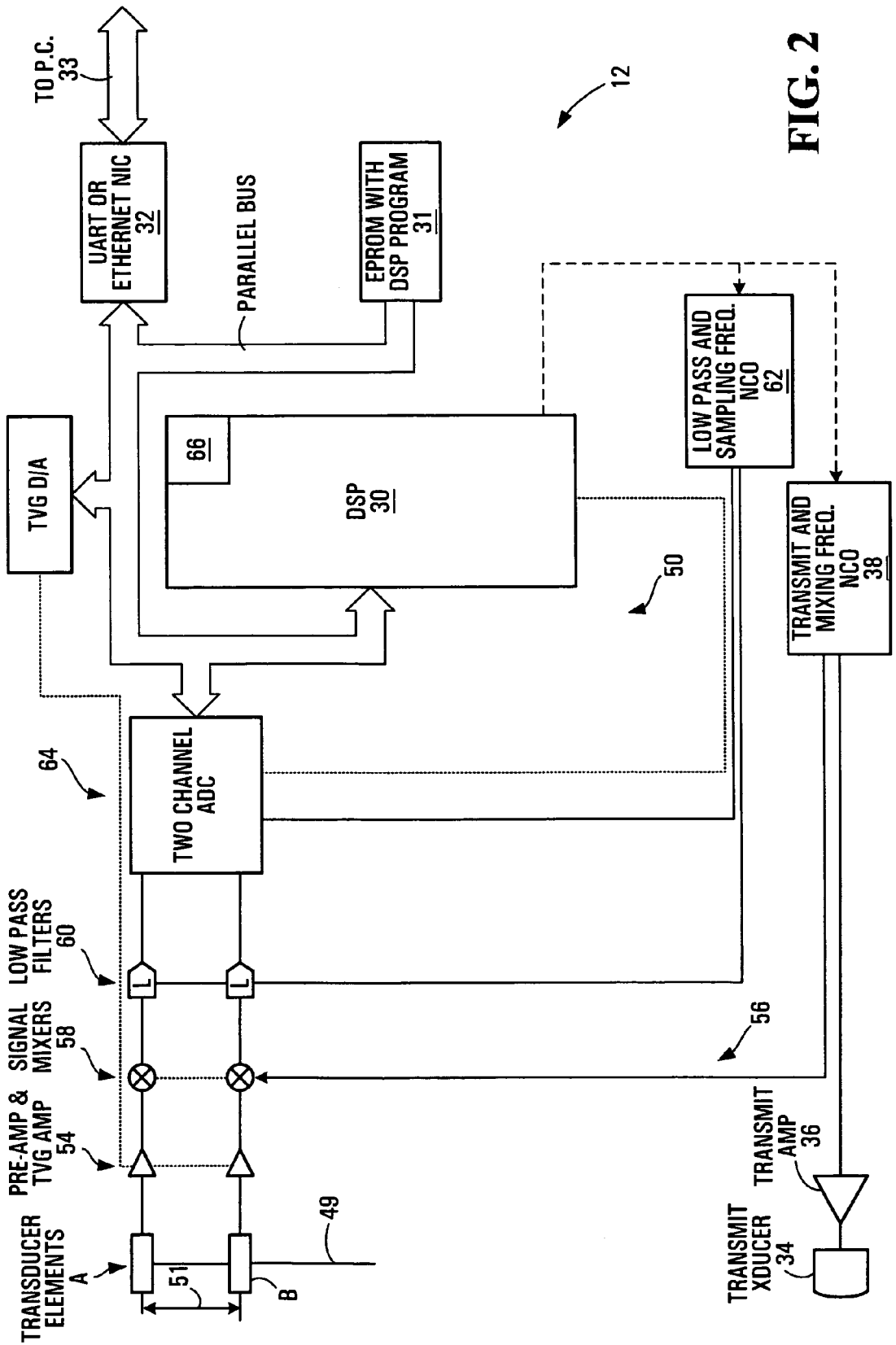
FIG. 2 is a block diagram of a sonar transducer unit of the system shown in FIG. 1.

Referring to FIG. 2, the sonar transducer unit 12 is shown in greater detail. The sonar transducer unit 12 includes a digital signal processor (DSP) 30 controlled by a program stored in an Erasable Programmable Read Only Memory (EPROM) 31. The DSP 30 is in communication with a communications interface 32, which in this embodiment includes a Universal Asynchronous Receiver Transmitter (UART) or Ethernet Network Interface Chip, for example. The communications interface 32 is in communication with the processor 14 shown in FIG. 1, through a cable 33 extending from the transducer unit 12 to the processor 14 and facilitates communications between the DSP 30 and the processor 14. The DSP 30 is operable to receive a "remote" command signal from the processor 14, the remote command signal containing depth range information. The DSP extracts this depth range information and produces one or more "local" command signals to control various components of the sonar transducer unit 12.

Figures 3, 4:
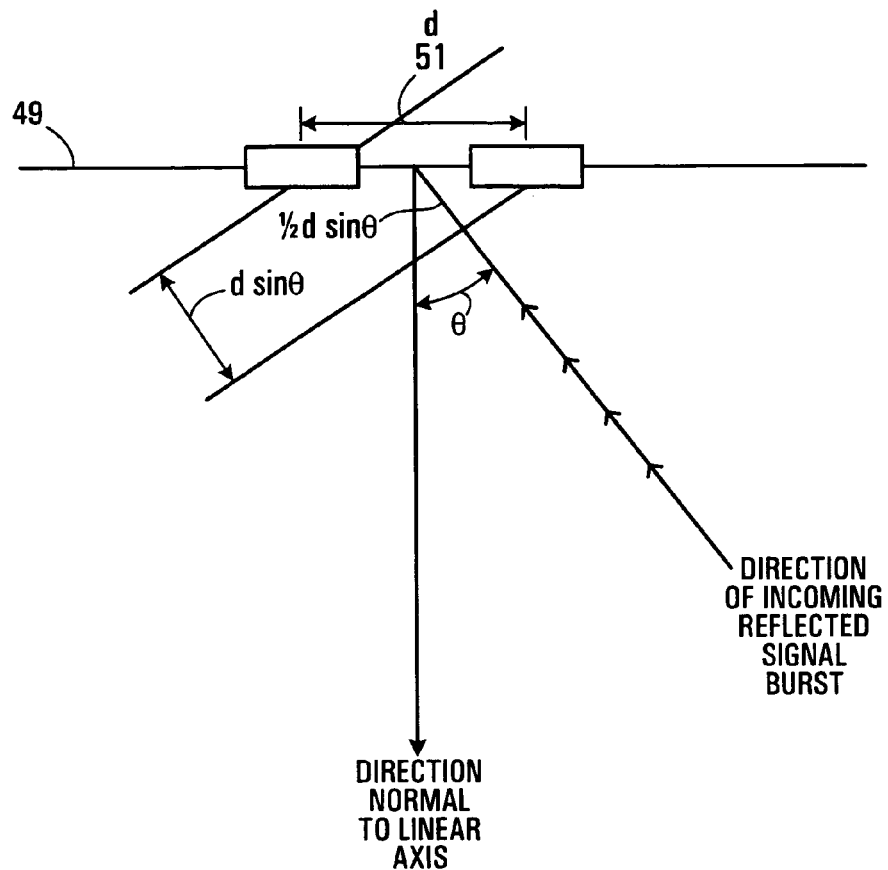
FIG. 3 is a schematic representation depicting a phase delay in receiving a sound wave at transducer elements of the sonar transducer unit shown in FIG. 2.
FIG. 4 is a table showing a relationship between depth range of interest, delta frequency, reference frequency, sample frequency, filter cutoff frequency respectively used by the transducer unit shown in FIG. 2.

In this embodiment the sonar transducer unit 12 includes a sonar signal source, referred to hereafter as a transmit transducer or sonar signal transducer 34. The transmit transducer 34 produces sonar signals in response to electrical input signals received from a transmit amplifier 36 which receives input signals from a transmit and mixing frequency numerically controlled oscillator (NCO) 38 controlled by a local command signal produced by the DSP 30. In this embodiment, the DSP 30 and transmit and mixing frequency NCO 38 cooperate to cause the transmit transducer 34 to produce a sonar signal burst of acoustic energy having a "ping length", the ping length being dependent upon the depth range of interest specified in the local command signal. Exemplary ping lengths for various depth ranges of interest are shown in FIG. 3 and in general, ping length is made longer for greater depth ranges and shorter for lesser depth ranges. The sonar signal burst of acoustic energy also has an acoustic frequency set by the transmit and mixing frequency NCO 38 in response to the local command. The acoustic frequency may be 320 kHz, for example, and in general, it may be any frequency that provides for suitable acoustic energy propagation in the medium (e.g., water in this embodiment) in which depth or distance is to be measured.

Referring back to FIG. 1, the burst of acoustic energy propagates through the water and is reflected by elements in the water, such as fish 42 or the ocean bottom 44, for example, which cause a reflected acoustic pressure signal burst to be reflected back to the transducer unit 12.

Referring to FIGS. 1 and 2, in general, the transducer unit 12 receives the reflected acoustic signal burst at a plurality (m) of transducer elements which in this embodiment includes only two elements, to produce a plurality of received signals, generates a reference signal having a reference frequency dependent on a depth range of interest, heterodynes each of the received signals with the reference signal to produce respective beat signals having a beat frequency, samples each of the beat signals at a sampling frequency dependent on the beat frequency to produce sets of sample values, each set of sample values being associated with a corresponding transducer element, and makes each set of sample values available for processing.

Referring back to FIG. 2, to carry out the above operations, the transducer unit 12 includes a sonar signal receiver apparatus such as shown generally at 50 comprising transducer elements A and B arranged side by side on a linear axis 49 with a spacing 51 of about 3 mm between the transducer elements. Other spacings could be used.

Referring to FIG. 3, the transducer elements A and B receive the reflected acoustic signal burst from any reflecting elements within the water. Generally, for any given beam angle θ measured from a line normal to the linear axis 49, midway between the transducer elements A and B, the transducer elements receive the reflected signal burst from a given reflecting element at different times due to the difference in distance between the given reflecting element and each transducer element as a result of the spacing 51 between the transducer elements. In general, a reflected sound wave having the same amplitude-time properties is received at each transducer element A and B but appears to be shifted in time due to the differences in travel time of the reflected acoustic signal burst to reach respective transducer elements A and B.

Referring back to FIG. 2, in this embodiment, each of the transducer elements A and B has an associated signal conditioning stage as shown generally at 54, which, in this embodiment includes a pre-amplifier and time varying gain amplifier for producing a suitably strong amplified analog electrical signal representing the reflected acoustic signal received at the corresponding transducer element.

The receiver apparatus 50 further includes a heterodyning component shown generally at 56 operable to heterodyne each of the amplified transducer element signals with a reference signal to produce respective modulated signals. The reference signal is produced by the transmit and mixing frequency NCO 38 which acts as a reference signal frequency generator to produce the reference signal in response to the local command signal received from the DSP 30. As stated, the local command is produced by the DSP 30 in response to depth range information in the remote command received from the processor 14. In this embodiment, the reference signal has a reference frequency which is the sum of the acoustic frequency and a "delta" frequency. Delta frequencies and resulting reference frequencies for various depth ranges are shown in FIG. 4. Thus, in response to a local command signal indicating a depth range of interest, the reference frequency generator (NCO 38) produces a reference signal having a reference frequency as indicated in the table shown in FIG. 4.

Referring back to FIG. 2, the heterodyning component 56 includes two signal mixers shown generally at 58 which multiply the reference signal with respective individual amplified transducer element signals to produce respective mixed signals. It will be appreciated that a reference signal at a reference frequency associated with a particular depth range is mixed (multiplied) with the signals produced by each transducer element, which have a frequency at the acoustic frequency (e.g., 320 kHz). The resulting modulated signals each have sum and difference components having frequencies $f_1+f_2$ and $f_1-f_2$ respectively, which preserve the relative phase of the received sound pressure from the different transducer elements. The difference component also referred to as a beat component contains the amplitude information of the original received signal and has a beat frequency corresponding to the delta frequency employed for the particular depth range of interest. The beat components associated with respective transducer elements A and B are used for further processing in this embodiment.

The beat components are applied to respective cutoff frequency controlled low pass filters as shown generally at 60 to produce respective beat signals. These filters are controlled to have a common cutoff frequency set by a cutoff frequency control signal produced by a low pass and sampling frequency numerically controlled oscillator (NCO) 62 controlled by a local command produced by the DSP 30. The NCO 62 produces the cutoff frequency signal such that the cutoff frequency of the cutoff frequency controlled low pass filters is dependent upon the beat frequency as determined by the delta frequency set according to the depth range of interest, in response to the local command received from the DSP 30. The low pass filters 60 thus produce filtered beat signals associated with array elements A and B, respectively, having a frequency dependent on the reference frequency.

Figure 5:
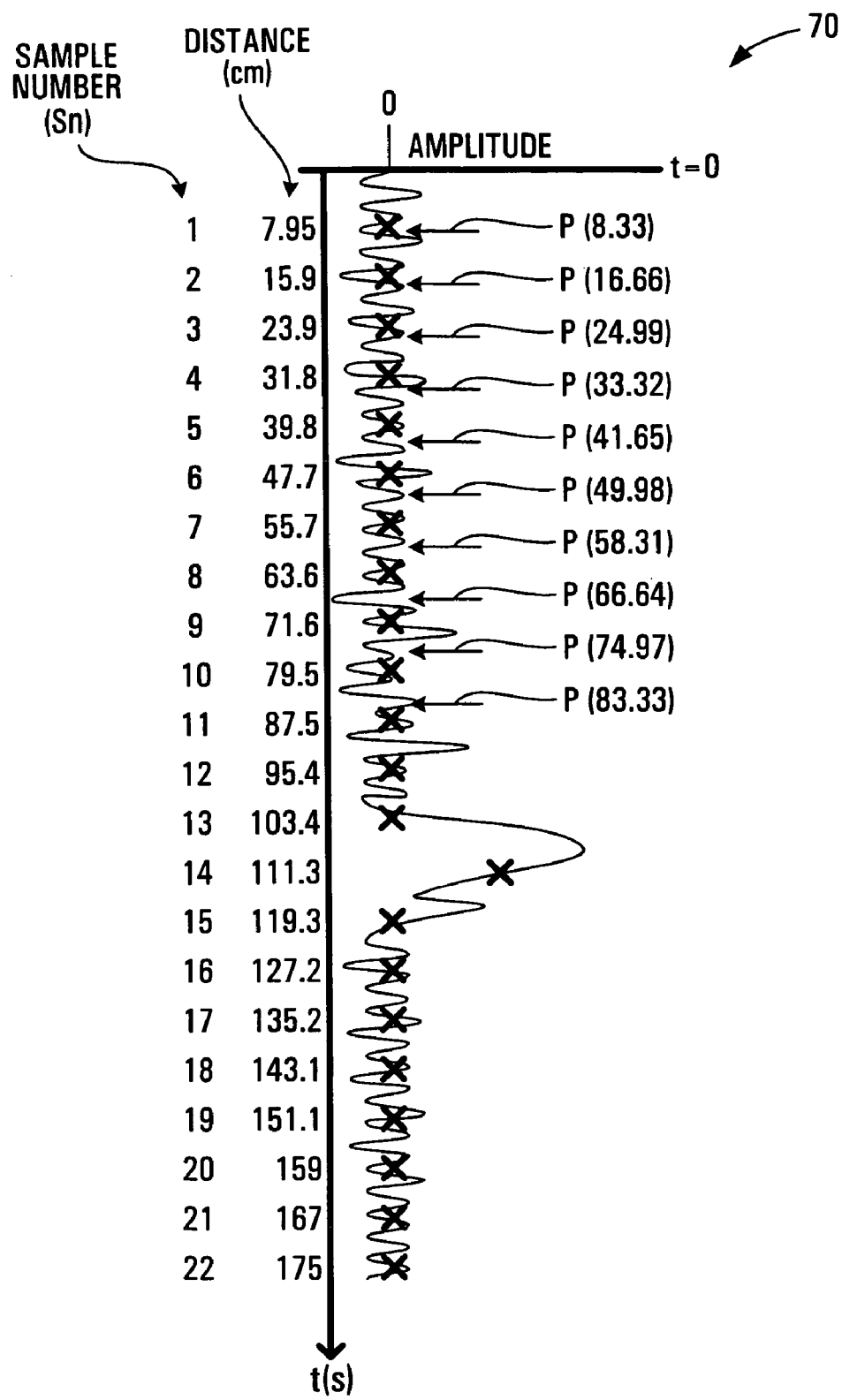
FIG. 5 is a graphical representation of a time-amplitude representation of a waveform produced by a transducer element of the sonar transducer unit of FIG. 2, showing sample-defined positions and pixel-defined positions.

Referring to FIG. 5, a time-amplitude representation of acoustic pressure received at a given transducer element such as element (B), for example, is shown generally at 70. Amplitude is shown relative to a reference value of zero with positive amplitude values being to the right of the zero value and negative amplitude values being to the left of the zero value. Time is shown increasing in the downward direction. Time is related to distance by the speed of sound in water and thus increasing time relative to a reference time t=0 represents increasing distance from a reference point such as a center point between the two transducer elements A and B, on the linear axis 49 in the sonar transducer unit 12 shown in FIG. 1. In embodiments in which electromagnetic energy is used instead of acoustic energy, the transducers would include antennas and the amplitude of a reflected electromagnetic wave received at an antenna could follow a similar trace.

Referring back to FIG. 2, in the embodiment shown, the transducer unit 12 further includes a sampling component 64 which, in this embodiment, includes the DSP 30 and a two-channel analog to digital converter which cooperates to individually simultaneously sample each of the beat signals to produce respective sets of time domain sample values, each set being associated with a respective transducer element A and B. The DSP 30 initiates sampling shortly after an acoustic burst is issued by the transmit transducer 34 and continues sampling until shortly after all reflected acoustic signals are expected to have been received, as determined by the depth range of interest.

The sets of sample values are stored in memory 66 incorporated in the DSP 30. To effect sampling, the DSP issues a local command to the low pass and sampling frequency NCO 62 which acts as a sampling signal frequency generator that generates a sampling signal for controlling the sampling component 64 to sample the filtered beat signals at a sampling frequency. The sampling frequency is set according to the depth range of interest and, more particularly, is set to be a multiple of the expected beat frequency of the beat signals, ultimately determined by the "delta" frequency. In this embodiment, the sampling frequency is set at 2.4615 times the delta frequency. Exemplary sampling frequencies for various depth ranges are shown in the table shown in FIG. 4.

Referring back to FIG. 2, the sampling component 64 is controlled such that the same number of sample values is produced regardless of the depth range of interest. In this embodiment, 500 sample values are included in each set of sample values, regardless of range. Thus, in this embodiment, 2 sets of 500 samples are produced. The effect of producing the same number of samples regardless of the depth range of interest is that for greater depth ranges, the distance the sound travels between samples is greater than at lesser depth ranges. Fine resolution over long distances is usually not required and can exceed the resolution of the display and thus, a larger number of samples at a greater depth range is not required.

Referring back to FIG. 5, sample points, i.e. times at which samples are taken by the sampling component 64 of FIG. 2, are shown with an x. The x's thus depict sample-defined positions along the waveform. A corresponding distance in cm for a 40 m-depth range of interest is shown for each sample point. A corresponding sample number $S_n$ is also shown. Thus, for example, sample number 6 is associated with a distance of 47.7 cm from the transducer elements A and B.

Referring back to FIGS. 1 and 2, the programs in the EPROM 31 include program code for implementing a communications function to cause the DSP 30 to transmit to the processor 14, via the communications interface 32, the sets of sample values for further processing at the processor 14. These codes and the DSP 30 act as a communications component operable to communicate each set of sample values to the processor 14 for interpretation to control the illumination of pixels on the display 16 to ultimately produce a display image.

In other embodiments, a plurality of transducer elements may be employed. For example, an array of sixteen transducer elements may be employed and a separate set of sample values may be produced and communicated to the processor 14 for each respective transducer element. As will be appreciated below, at least two sets of samples from two separate, spaced apart transducers are required.

Referring back to FIG. 1, the processor 14 may include a Personal Computer (PC) style computer, for example, of the type having a 2.8 GHz Pentium IV processor chip, for example. Various computer implementations could be used, provided they have enough processing speed to perform the calculations described below sufficiently fast to avoid a noticeable delay in producing successive updates of a display image seen on the display 16. For completeness, an exemplary processor circuit, suitable to perform the operations described herein is shown at 72 in FIG. 6. The exemplary processor circuit includes a central processing unit (CPU) 74, program memory 76, random access memory 78 an input interface 80 and an output interface 82.

The program memory 76 acts as a computer readable medium for storing program codes for directing the CPU, (hereinafter referred to as a processor) to carry out the functions described herein. The random access memory 78 may be used by the processor to store the sets of samples from each transducer element, for example.

The input interface 80 is in communication with a user input device 84, which may include a keyboard, pointing device or other human interface. The input interface 80 and the output interface 82 are in communication with a communications unit 86 which is in communication with the sonar transducer unit 12 to permit the processor to send the above described remote command to the sonar transducer unit 12 and to permit the processor to receive the sets of sample values associated with respective transducers.

The input interface 80 may include provisions such as a network interface 88 for receiving from a network, such as the Internet, computer readable signals encoded with codes operable to be stored in the program memory 76 for directing the processor to carry out one or more of the functional tasks described herein.

In addition, or alternatively, the input interface 80 may be connected or connectable to a media reader 90 operable to read computer readable media that may provide codes operable to be stored in the program memory 76 for directing the processor to carry out one or more of the functional tasks described herein. The output interface 82 is in communication with the display 16 to control the display to produce an image representing objects beneath the boat.

In general, the codes stored in the program memory 76 direct the processor to carry out a process for producing illumination signals for use in controlling illumination of pixels on a display, in response to the sets of sample values associated with respective transducers.

Figure 7:
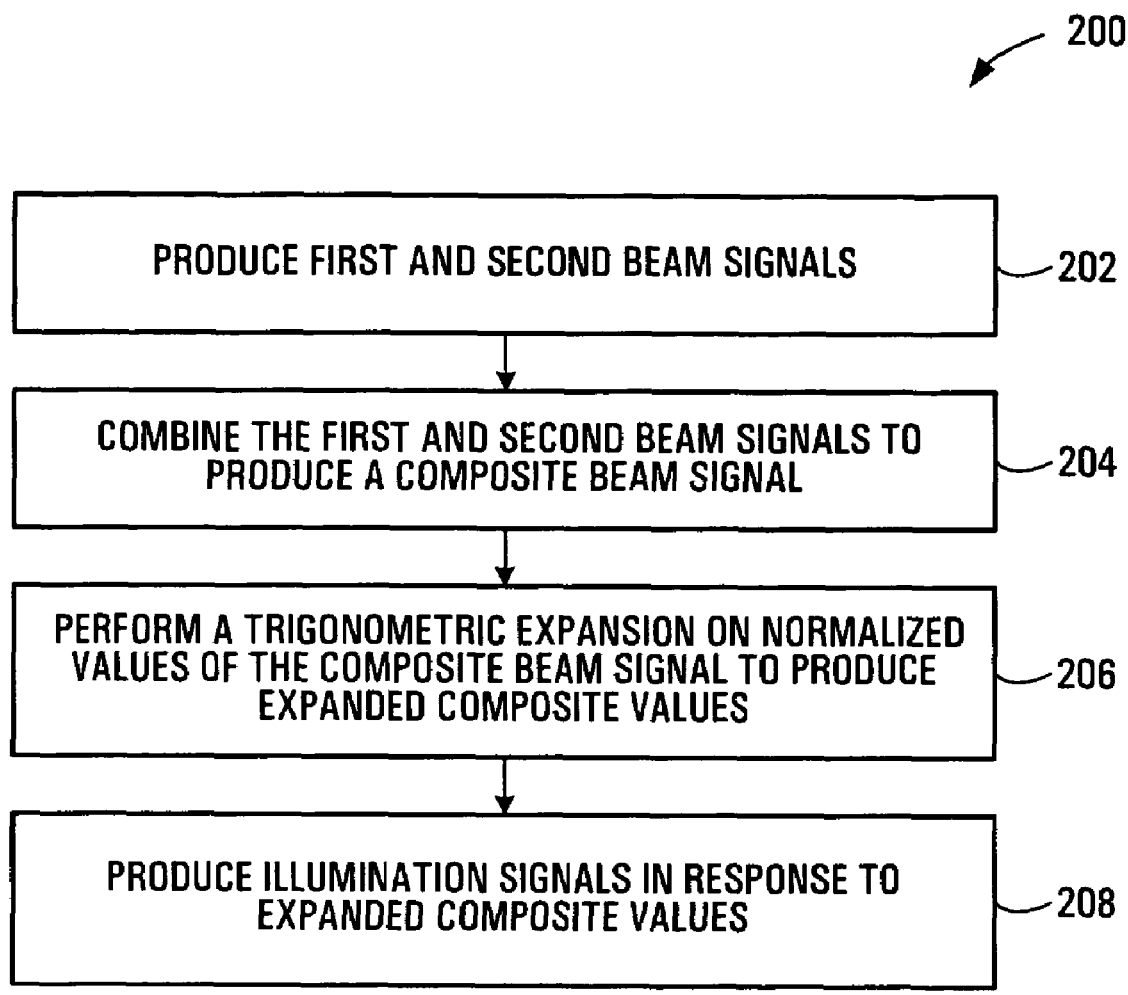
FIG. 7 is a flow chart representing a process for producing signals for controlling a display to produce an image in an imaging system such as shown in FIG. 1.

Referring to FIG. 7, as shown at 200, a broad explanation of the process for producing signals for controlling a display to produce an image in an imaging system is shown. As shown at 202, the process involves producing first and second beam signals in response to delayed channel signals associated with respective transducers. The delayed channel signals may be previously produced by the same processor or another processor in response to the sets of sample values associated with respective transducers and represent real and imaginary components of time domain signals associated with respective transducers, suitably delayed to focus a receive beam pattern of the transducers at a beam angle. Effectively, the function shown in block 202 involves combining the delayed channel signals to produce only two beam signals. Each of the first and second beam signals includes separate real and imaginary component representations. Combining the delayed channel signals for respective transducers may be done by adjusting the amplitudes of the sample values of each set of samples, according to suitable delay values associated with a desired beam angle at which it is desired to focus the array and then for each sample time, adding the adjusted sample values to produce a combined sample value for that sample time. The combined sample values may then be scaled, as desired, into a workable range.

Combining sets of sample values can be done symmetrically, such as by combining the delayed channel signals associated with the first eight transducers in a set of sixteen transducer elements, for example, to produce the first beam signal and then combining the sample values associated with the ninth through sixteenth transducers to produce the second beam signal.

Alternatively, the sets of sample values associated with each transducer may be asymmetrically combined. For example, the set of sample values associated with the first through fourth transducers may be combined to produce the first beam signal and the sets of sample values associated with the fifth through sixteenth transducers may be combined to produce the second beam signal, or vice versa.

When sets of samples for a plurality of transducers are combined into two beam signals, effectively each beam signal represents a channel signal associated with a respective virtual transducer, since there is no single transducer with which the actual first and second beam signals are associated. Thus, the first and second beam signals represent received at a respective real or virtual transducer.

As shown at 204, the process then involves combining the real and imaginary components of the first and second beam signals, to produce a composite beam signal. The composite beam signal includes separate real and imaginary component representations.

As shown at 206, the process then involves performing a trigonometric expansion on normalized values of the real and imaginary component representations of the composite beam signal to produce a plurality of expanded values.

As shown at 208, the process then involves producing illumination signals in response to the expanded values, for illuminating pixels on the display.

The broad process shown in FIG. 7 may be used in the acoustic imaging system shown in FIG. 1, with suitable adaptations to facilitate use with a plurality of transducers, if desired, and with certain considerations for processing information for a plurality of beam angles at once.

Figure 8:
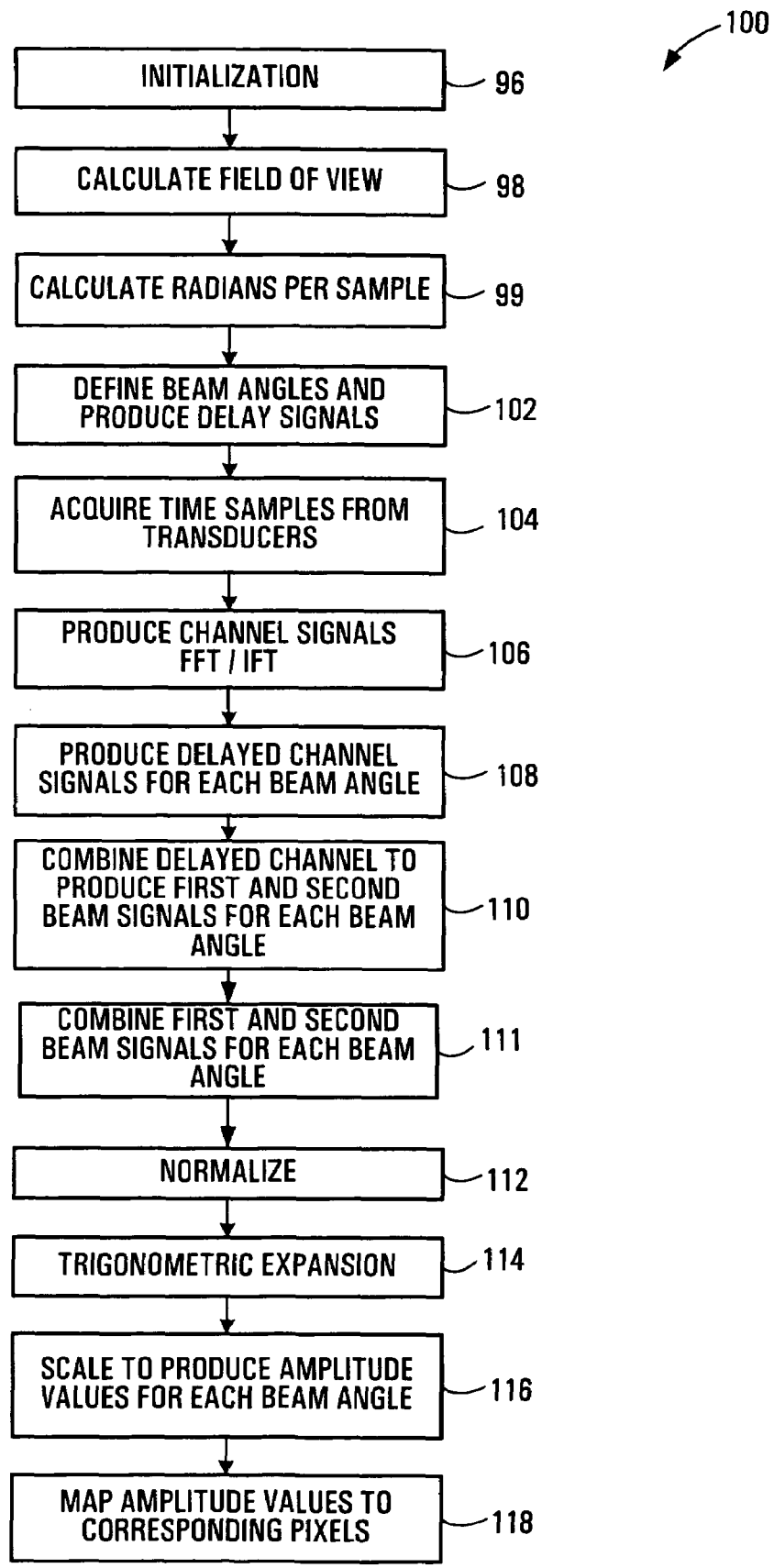
FIG. 8 is a high level flow chart representing code executed by a processor circuit shown in FIG. 6, to implement the process shown in FIG. 7, in the sonar imaging system shown in FIG. 1.

An embodiment of the broad process adapted for use in the acoustic imaging system of FIG. 1, is shown generally at 100 in FIG. 8. In this embodiment, the generic process shown in FIG. 7 has been adapted to further include additional functions to adapt the process to the particular display used.

The process applied to the acoustic imaging system in FIG. 1 includes a first initialization step depicted generally at 96 in FIG. 8. Initialization is carried out by a block of program codes that directs the processor 72 shown in FIG. 6 to retrieve initialization parameters from program memory 76. Initialization parameters may be stored in a file and retrieved by the processor on power up. These initialization parameters may be used by the processor to set color schemes for the display 16, for example, by creating a mapping between signal intensity and color. The color red for example may be used to identify signal portions of greater intensity or amplitude, while blue for example may be used to represent signal intensity or amplitude near zero. The initialization parameters may also be used to initialize any mathematical variable or arrays used for computations to follow.

The processor may include routines (not shown), that cause it to receive user input from the user input device 84, or referring to FIG. 2, to communicate with the DSP 30 in the transducer unit 12, to acquire data indicating the spacing 51 between the transducer elements (e.g. 3 mm), the acoustic frequency (e.g. 320 kHz), the speed of sound in water (e.g. 1500 m/s), the sampling frequency used by the receiver (e.g. 9.375 kHz) and any other information that may be necessary. In addition user input may be provided through the user input device 84 to indicate to the processor the dimensions or useable area of the display 16 in pixels (e.g. 640×480), for example, in which an image may be displayed.

In addition, as part of the initialization, program codes (not shown) may be provided to present menus on the display 16 to permit a user to select a depth range of interest. The user may select a depth range of 5, 10, 20 or 40 meters, for example, and referring to FIG. 1, may select a reference plane 103 such as a plane coincident with the linear axis 49, or a non-axis-coincident reference plane 105 at a depth below the plane coincident with the linear axis. The range may be set to 40 meters, for example and the reference plane may be set at 20 meters, for example, thus selecting an area of interest of between 20 and 40 meters depth. Regardless of the area of interest, once the area of interest is known, and the useable area of the display 16 is known, a mapping can be created to map the locations of pixels on the display to corresponding locations within the area of interest. In other words, pixel positions on the display are mapped to or associated with "pixel-defined positions" in the area of interest. In addition, once the range is known, the reference frequency, sample frequency and filter cutoff frequency to be used by the transducer unit may be determined from the table shown in FIG. 4, before any acoustic energy is emitted or received.

Referring back to FIG. 8, after the initialization provided by block 96, block 98 directs the processor to determine a field of view of the system according to the relation:

$$B_{max} = 2\sin^{-1}\left(\frac{c_s}{2fd}\right)$$

Where:
- $B_{max}$ is the field of view in degrees;
- $C_S$ is the speed of sound in water (e.g. 1500 m/s);
- f is the acoustic frequency (e.g. 320 kHz); and
- d is the transducer element spacing (e.g. 3 mm).

Using the above exemplary numbers, an exemplary field of view is 102.75 degrees centered on the linear axis 49. Once the field of view has been calculated, the processor sets the color of every pixel associated with a location outside of the field of view to black, and only considers and performs calculations to determine illumination intensity for pixels at locations on the display 16 that have corresponding locations inside the field of view, in the area of interest.

After determining the field of view, block 99 directs the processor to pre-calculate the number of radians per sample of the original sound waves according to the relation:

$$R_d = 2\pi f/S_r$$

Where:
- $R_d$ is the number of radians per sample
- f is the frequency of the acoustic energy (e.g., 320 kHz)
- $S_r$ is the sample rate in samples per second (e.g., 9.375 kHz)

Block 102 directs the processor to produce delay signals in response to transducer spacing, angular frequency of wave energy received at the transducers, desired beam angle and speed of the wave energy in an area of a medium for which the image is to be produced.

Referring back to FIG. 8 block 102 first directs the processor to define a plurality of beam angles and pre-calculate delay signals for each beam angle within the field of view. In the embodiment shown, arbitrarily, 150 beam angles are defined.

Referring to FIG. 3, if the sound energy reflected from a reflecting element is received at the transducers at an angle θ relative to a direction normal to the linear axis 49, the sound must travel a distance d sin θ after it is received at the transducer element B before it is received at the other transducer element A. Thus, to steer a receive beam to detect sound reflections from a given beam angle θ within the field of view, respective transducer-dependent time delays must be imposed on signals produced by the transducer element B that receives the acoustic pressure before the other transducer element A.

The transducer-dependent time delay in seconds, in a two-transducer system is given by the relation:

$$D = \frac{d\sin\theta}{c}$$

Where:
- D is the transducer-dependent time delay
- d is the transducer element spacing
- θ is an angle of incidence of sound energy reflected from a reflecting element within the field of view, i.e., beam angle
- c is the speed of sound in water (e.g. 1500 m/s)

The transducer-dependent delay D may be expressed in units of samples by multiplying the result of the calculation above by the sample rate $S_r$, to produce a delay value Δ representing a transducer-dependent radian advancement or retardation in a two transducer system as follows:

$$\Delta = \frac{dS_r \sin\theta}{c}$$

Where:
- Δ is the range delay in units of samples
- $S_r$ is the sampling frequency in samples per second
- d is the transducer element spacing
- θ is an angle of incidence of sound energy reflected from a reflecting element within the field of view
- c is the speed of sound in water The transducer dependent delay may be expressed in units of radians by multiplying Δ by the number of radians per sample $R_d$:

$$ST_r = \Delta R_d$$

Figure 9:
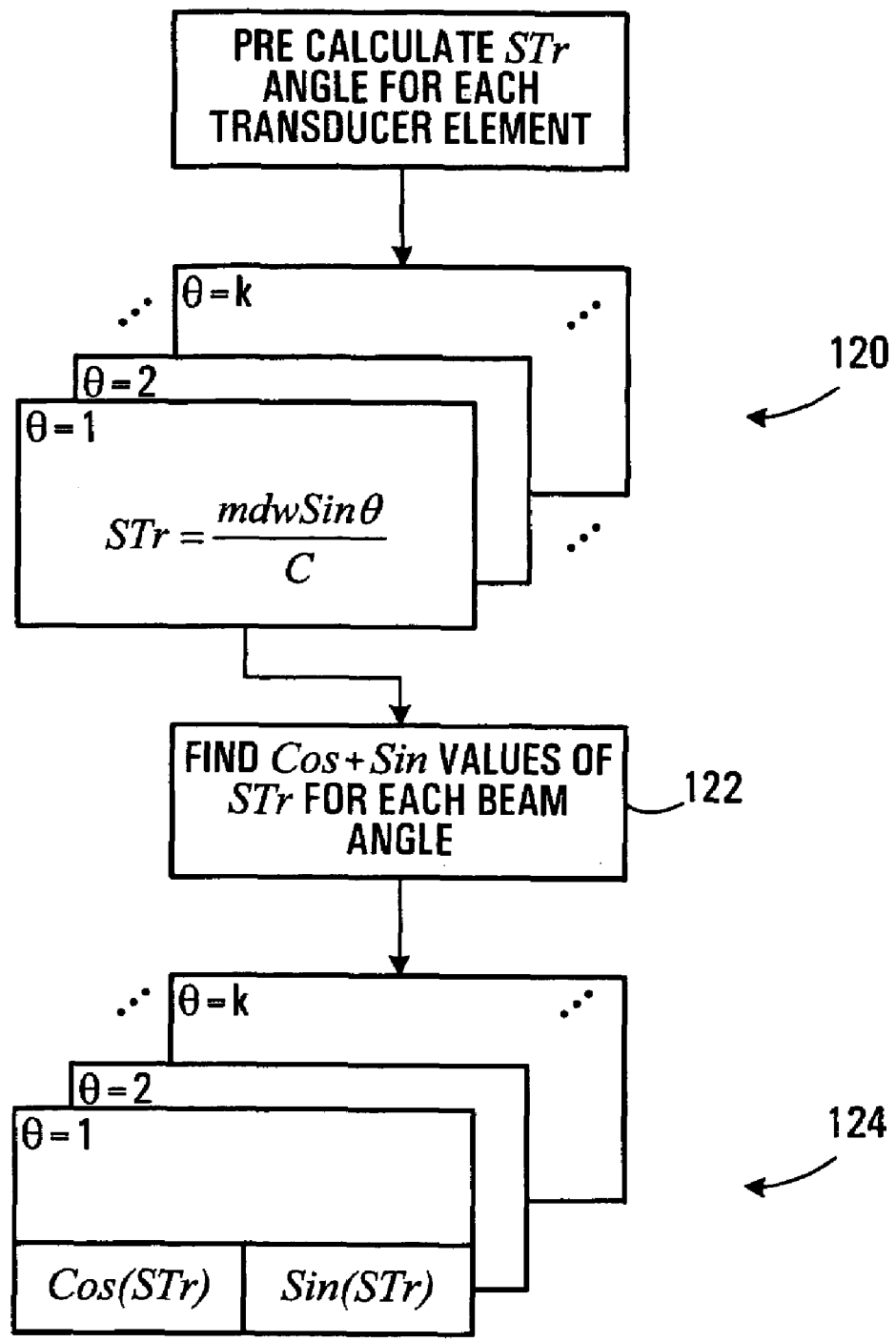
FIG. 9 is a flow chart representing blocks of code executed by the processor circuit shown in FIG. 6, for pre-calculating phase delays for use in the process shown in FIG. 8.

Referring to block 120 in FIG. 9, in this embodiment, $ST_r$ values are calculated for all 150 beam angles, for example, within the above calculated field of view, according to the relation:

$$\theta_{[k]}, k = 1 \text{ to } 150: ST_r[k][m] = \frac{md\omega\sin(\theta[k])}{c}$$

Where:
- $\theta_{[k]}$ is the $k^{th}$ beam angle
- m is the $m^{th}$ transducer element
- $ST_r$ is the range delay in units of radians
- d is the transducer element separation distance
- c is the speed of sound in water
- ω is the cyclic frequency of the emitted acoustic burst The above relation provides a suitable approximation for calculating delay values where it is assumed the sound wave impinging upon the transducer elements is a plane wave. Other geometric relations may be more suitable for calculating beam angles where the impinging sound wave is more spherical for example, i.e. at close range. For example, if a representation of a pixel position of interest can be obtained relative to the transducer elements, simple triangulation can be used to determine a corresponding beam angle for that pixel and each transducer element.

As shown in FIG. 9, pre-calculation of the range delay $ST_r$ for each beam angle results in 150 transducer-dependent phase values ($ST_r[k][m]$), represented in units of radians, for each transducer element as depicted generally at 120. As shown at 122, sine and cosine values are then produced for each beam angle, i.e., Sin ($ST_r[k][m]$) and Cos ($ST_r[k][m]$), to produce 150 pairs of Sine and Cosine values as shown at 124, for each of the first and second transducers A and B, for each beam angle.

The sine and cosine values associated with the first transducer act as a first delay signal and the sine and cosine values associated with the second transducer act as a second delay signal. Thus it will be appreciated that in this embodiment, the first and second delay signals are pre-calculated before receiving or producing the first and second channel signals. Alternatively, the delay signals for each transducer may be pre-calculated by another processor and sent to the processor shown in FIG. 6, or they may be pre-calculated and stored in memory for use by the processor shown in FIG. 6.

Referring back to FIG. 8, block 104 directs the processor to acquire time samples from the transducers. This may involve causing the processor shown in FIG. 6 to communicate with the transducer unit 12, to cause it to initiate the sampling process as described above to cause the transducer unit to send sets of samples from each transducer to the processor shown in FIG. 6. Representations of time samples are shown generally at 126 in FIG. 10A, for example.

Block 106 then directs the processor to produce channel signals for respective transducers, in response to respective sets of time samples. To do this the processor is directed to perform a Fourier Transform on each respective data set 126 to produce respective frequency domain representations of the sets of time samples and then to perform an inverse Fourier Transform on respective frequency domain representations to produce respective representations of synthesized waveforms representing time domain representations of the waveforms associated with respective transducers. The representations of the synthesized waveforms may be referred to as channel signals.

Each synthesized waveform for each real or virtual transducer has the form:

$$A(t)\cos(\omega t)$$

Where:
- $A(t)$ is a time varying amplitude value dependent upon acoustic pressure received at the corresponding transducer element;
- $\omega$ is $2\pi f$, where f is the acoustic frequency; and
- t is a time value representing time since sampling was started The inverse Fourier Transform effectively provides sets of values 130 and 132 for each respective transducer, each set representing real and imaginary portions of its respective synthesized waveform at a plurality of sample points in time. The sets of values 130 and 132 thus represent a channel signal for corresponding transducers.

The sample times of the Inverse Fourier Transform may be referred to as Fourier sample times and coincide with the sample times of the original waveforms. In this embodiment, there are 500 such Fourier sample points for which there are corresponding amplitude values for each of the real and imaginary components, representing each synthesized waveform. The use of the Fourier Transform, immediately followed by an Inverse Fourier Transform, quickly and efficiently produces accurate representations of the real and imaginary portions of the synthesized waveform for convenient use in later calculations.

Figure 6:
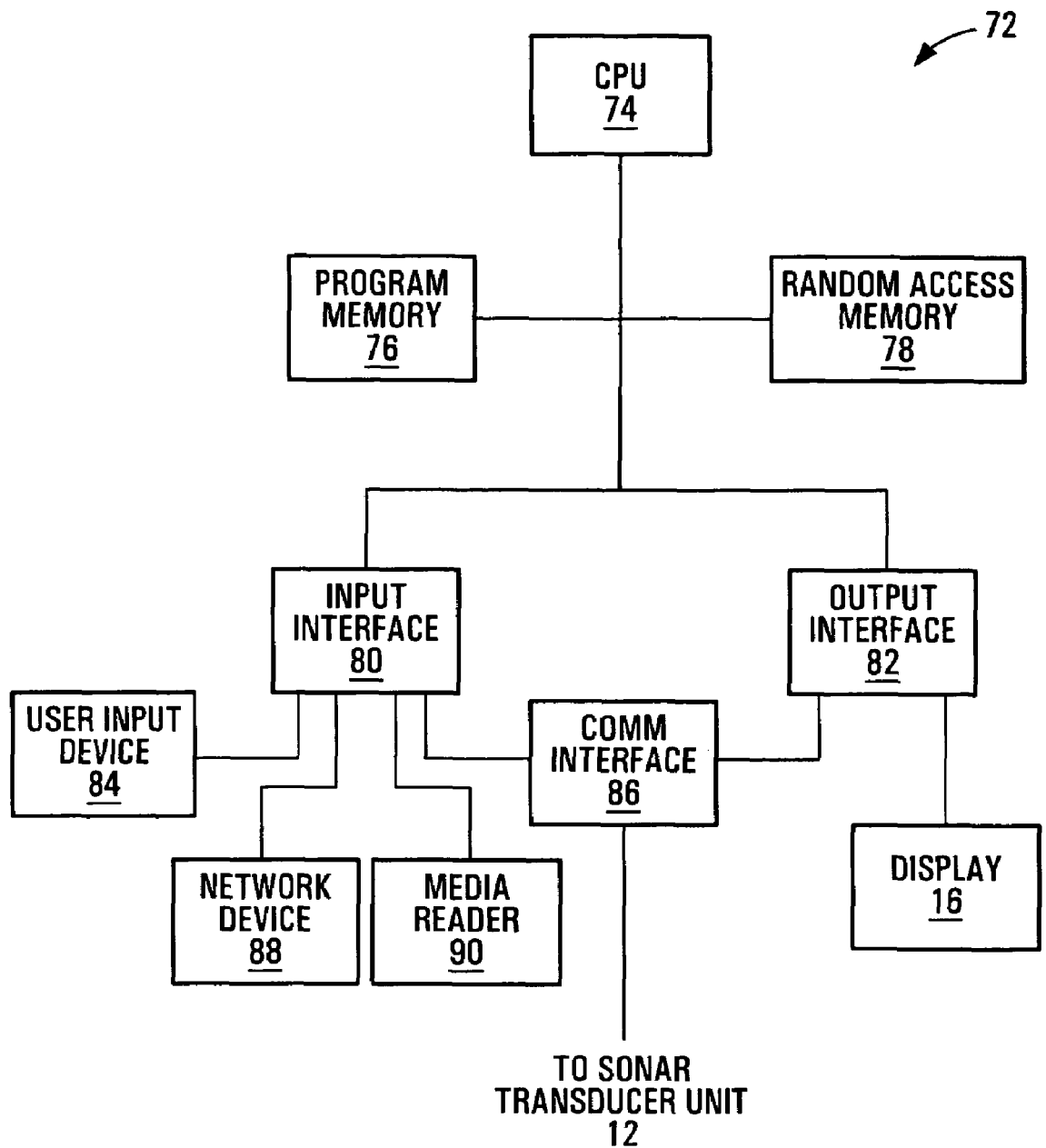
FIG. 6 is a block diagram of a processor circuit of a remotely located processor in the system shown in FIG. 1.

It will be appreciated that the processor may produce the channel signals in response to time samples from corresponding transducers or another processor may produce them and they may be received by the processor shown in FIG. 6 and processed as described below, regardless of whether they are produced or received by the processor shown in FIG. 6.

Channel signals are produced using the process described above in connection with blocks 126 and 106, for each transducer.

Figure 10A:
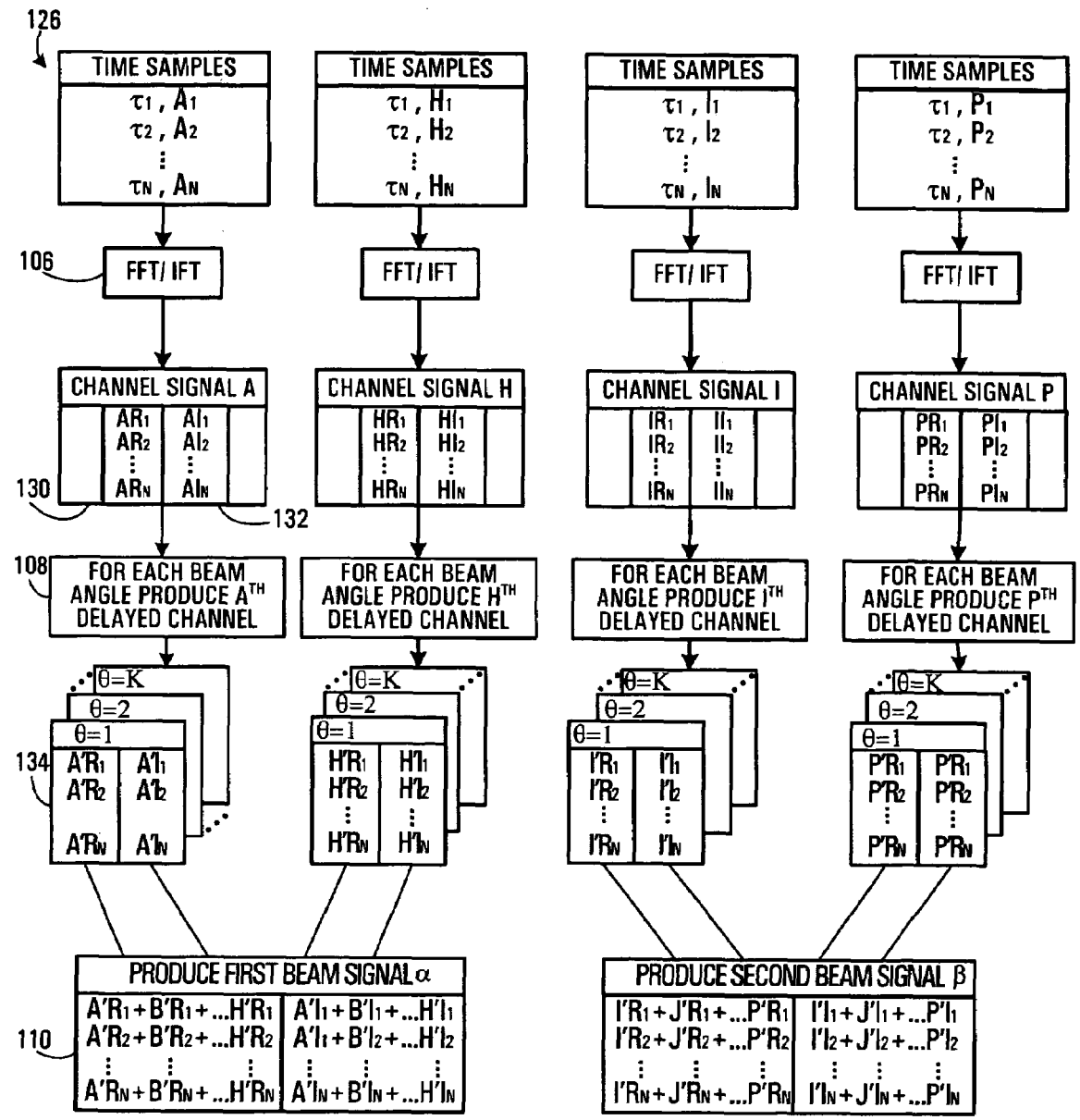
FIGS. 10A and 10B are a flow chart representing blocks of code executed by the processor circuit shown in FIG. 6, showing aspects of the process of FIG. 8 in greater detail.

Still referring to FIGS. 8 and 10A, after the first and second channel signals have been produced, block 108 directs the processor to produce the first and second delayed channel signals in response to the delay signals produced at block 102 and the channel signals produced at block 106.

For the first transducer, A, the Real and Imaginary components of the first channel signal are calculated as follows:

Real: $A'R_{k,n} = (\text{Real } A_{k,n})(\cos(ST_r[k][1])) - (\text{Imag } A_{k,n})(\sin(ST_r[k][1]))$ Imaginary: $A'I_{k,n} = (\text{Real } A_{k,n})(\sin(ST_r[k][1])) + (\text{Imag } A_{k,n})(\cos(ST_r[k][1]))$ where k=1 to 150 beam angles, n=1 to 500 sample points For the second transducer, B, the Real and Imaginary components of the second beam signal are calculated as follows:

Real: $B'R_{k,n} = (\text{Real } B_{k,n})(\cos(ST_r[k][2])) - (\text{Imag } B_{k,n})(\sin(ST_r[k][2]))$ Imaginary: $B'I_{k,n} = (\text{Real } B_{k,n})(\sin(ST_r[k][2])) + (\text{Imag } B_{k,n})(\cos(ST_r[k][2]))$ where k=1 to 150 beam angles, n=1 to 500 sample points In general, if there are more than two transducers, such as 16 transducers, as shown in FIG. 10A, the transducers may be labeled A-P and real and imaginary components for the delayed channel signal associated with a respective transducer may be calculated using the relations shown above. The result is shown generally at 134 in FIG. 10A where real and imaginary components of each delayed channel signal, for each beam angle are given for respective transducers A-P. Regardless of the number of transducers used, a delayed channel signal comprising real and imaginary components for a plurality of time samples and for a plurality of beam angles is produced for each respective transducer. The delayed channel signals represent real and imaginary components of time domain signals associated with the transducers, suitably delayed to focus a receive beam pattern of the transducers at a beam angle.

Referring to FIGS. 8 and 10A, as shown at 110, the transducers are then divided into two groups and the delayed channel signals of each group are combined to produce first and second beam signals respectively. In other words, the first and second beam signals are produced in response to the delayed channel signals.

In the case where 16 transducers are used and the transducers are divided symmetrically, the first beam signal is comprised of real and imaginary components $\alpha'R_{k,n}$, $\alpha'I_{k,n}$, respectively, which may be produced according to the relations:

$\alpha'R_{k,n} = A'R_{k,n} + B'R_{k,n} + \ldots H'R_{k,n}$ $\alpha'I_{k,n} = A'I_{k,n} + B'I_{k,n} + \ldots H'I_{k,n}$ The second beam signal is comprised of real and imaginary components which may be produced according to the relations:

$\beta'R_{k,n} = I'R_{k,n} + J'R_{k,n} + \ldots P'R_{k,n}$ $\beta'I_{k,n} = I'I_{k,n} + J'I_{k,n} + \ldots P'I_{k,n}$ As mentioned above, the transducers need not be grouped symmetrically. For example, the first four delayed channel signals may be combined as described above to produce the first beam signal and the fifth through sixteenth delayed channel signals may be combined to produce the second beam signal or other combinations of channel signals may be used.

Regardless of how the transducers are grouped, only two beam signals for each beam angle are ultimately produced.

Figure 10B:
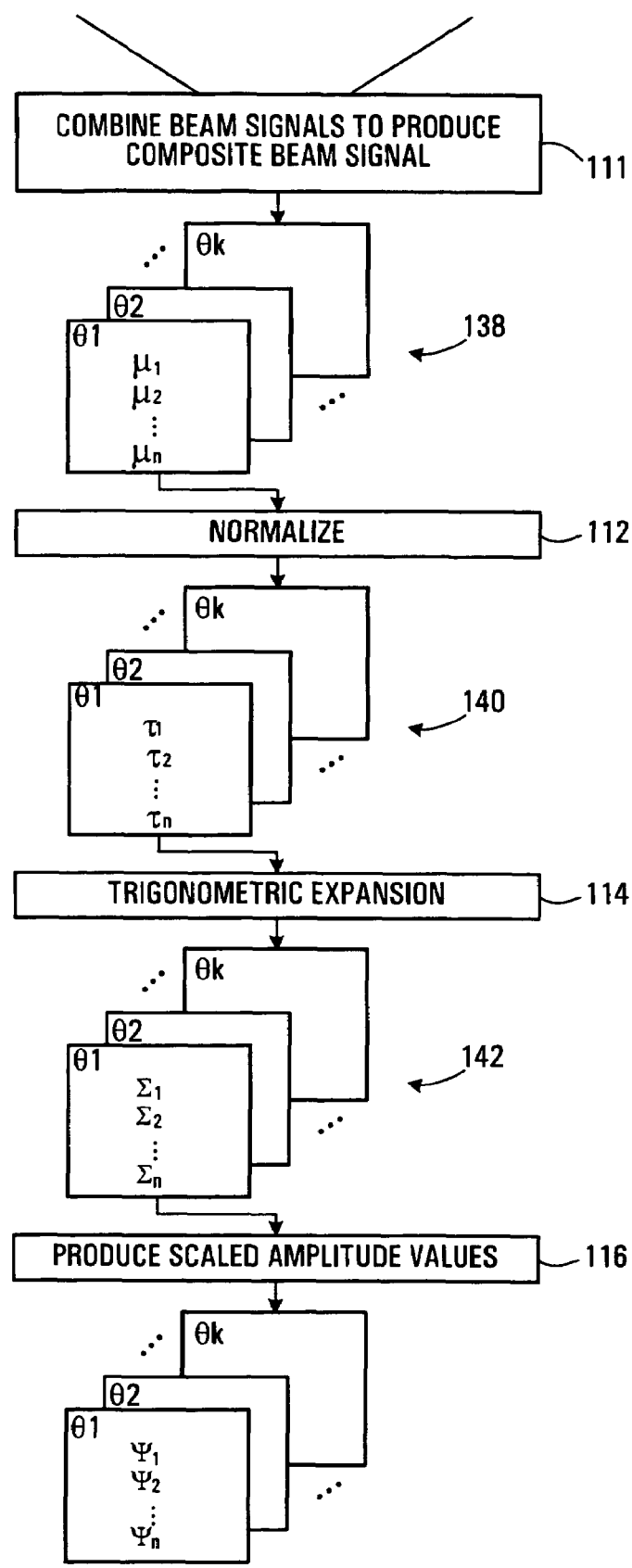

Referring to FIG. 10B as shown at 111, the real and imaginary components of the first and second beam signals are combined, to produce a composite beam signal for each beam angle, each composite beam signal including separate real and imaginary component representations as shown at 138.

The composite beam signal is comprised of a plurality of magnitude values produced according to the relation below in which the value $\mu$, represents the amplitude value of the composite beam signal at sample point n, at the given beam angle.

$$\mu_{k,n} = \sqrt{((\alpha R_{k,n})(\beta R_{k,n}) + \alpha I_{k,n})(\beta I_{k,n}))^2 + ((\alpha I_{k,n})(\beta R_{k,n}) - (\alpha I_{k,n})(\beta R_{k,n}))^2}$$

where k=1 to 150 beam angles, n=1 to 500 sample points

Block 112 then directs the processor to normalize the composite beam signal to produce a normalized composite beam signal for each beam angle. To do this, for each of the magnitude values of the composite beam signal the processor is directed to calculate a real part of the product of the first beam signal and the complex conjugate of the second beam signal and then scale the real part by the magnitude value. Thus, normalized composite values for each beam angle are produced according to the relation:

$$\tau_{rec\ k,n} = \frac{((\alpha R_{k,n})(\beta R_{k,n}) + (\alpha I_{k,n})(\beta I_{k,n}))}{\mu_{k,n}}$$

where k=1 to 150 beam angles, n=1 to 500 sample points

The normalized composite beam signal is thus comprised of a set of normalized composite values. The sets of normalized composite values are shown generally at 140 in FIG. 10B.

Referring back to FIG. 8, block 114 then directs the processor to perform a trigonometric expansion on each normalized composite value of each set of normalized composite values to produce expanded composite values. In the embodiment shown, the trigonometric expansion is the power expansion on respective values of the composite beam signal according to the relation:

$$\Sigma_{k,n} = 1 + \tau_{rec\ k,n} + (\tau_{rec\ k,n})^2 + (\tau_{rec\ k,n})^3 + \ldots (\tau_{rec\ k,n})^Z$$

where k=1 to 150 beam angles, n=1 to 500 sample points
In the embodiment shown z may be 17, for example.

This produces a set of expanded composite values for each beam angle, as shown at 142. Each of these expanded composite values for each angle will be near z if the signals of beams of the transducers are in phase, and will sum to near 1 otherwise.

In other embodiments, performing a trigonometric expansion may comprise performing a sum of Chebyshev polynomials on respective values of the composite beam signal.

Block 116 then directs the processor to produce scaled amplitude values from the expanded composite values according to the relation:

$$\psi_{k,n} = \Sigma_{k,n} (\mu_{k,n})^{1/2}$$

where k=1 to 150 beam angles, n=1 to 500 sample points
The result is a set of amplitude values for each beam angle.

Referring back to FIG. 8, block 118 directs the processor to map the sets of amplitude values associated with respective beam angles to corresponding rays on the display, and to use the amplitude values in a given set of amplitude values control the illumination intensity of respective pixels along the ray.

Figure 11:
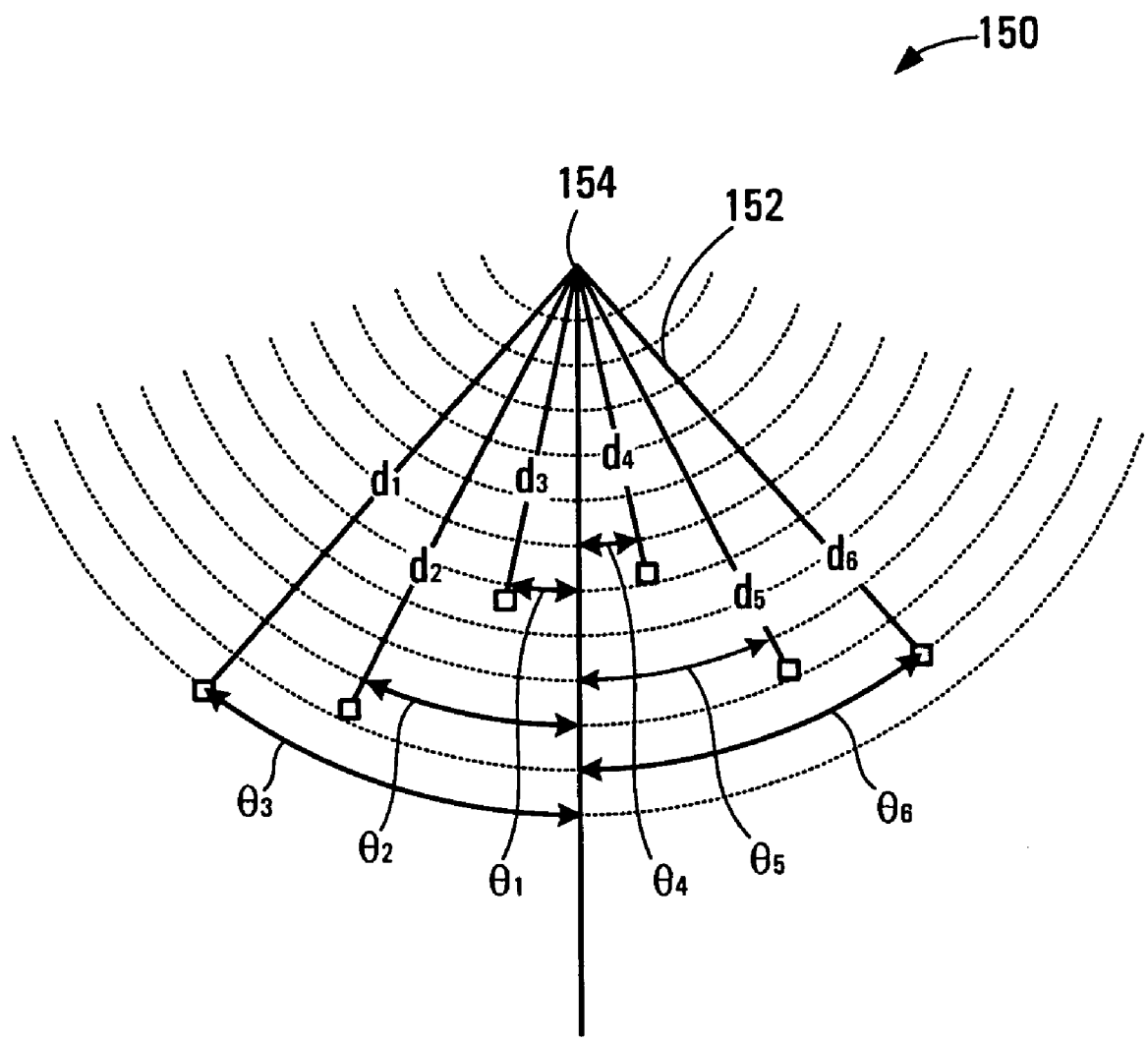
FIG. 11 is a schematic representation of a viewing area of the display shown in FIG. 1, where pixels are addressed by polar coordinates.

Referring to FIG. 11, an exemplary representation of the display 16 is shown generally at 150. The display may include a rectangular pixel array of 640 by 480 pixels, for example. Rays, one of which is designated 152 may be defined to emanate from a common point such as shown at 154, which corresponds to the centerpoint between the transducers A and B shown in FIGS. 2 and 3. In FIG. 11, six rays are shown, each at a different angle 1-6 corresponding to a respective beam angle. From the initialization procedures performed by block 96 in FIG. 7 and from the knowledge of the field of view and number of radians per sample determined by blocks 98 and 99 in FIG. 7, the sample time is known and thus so is the sample distance.

The sample distance may be related to pixels on the display by mapping the sample distance to a pixel distance representing a distance on the display, from the common point 154. The mapping, of course, depends upon the scale of the display.

Effectively, for a given beam angle, the representative waveform shown in FIG. 5 may be considered to lie on one of the rays shown in FIG. 11 such that the zero time position is coincident with the common point 154 and a maximum time point is coincident with the 480$^{th}$ pixel along the ray. In effect, the representative waveform is mapped onto the ray on the display 16.

If the sampling frequency is 9.375 KHz, the sampling period is 1/9.375 KHz=106 microseconds. Since sound travels at approximately 1500 m/s in water, in the time between successive sample times, the sound travels 0.159 m, thus, between time=0 and the first sample time, the sound must travel from the transmit transducer to the underwater element and back to the receive transducers. The total distance traveled is twice the distance to the underwater element, thus, each time between samples represents a depth increment or sample distance of 0.159/2=0.0795 m, i.e., a sample distance of 7.95 cm. Sample distance values are thus shown at the left-hand side of FIG. 5, in 7.95 cm increments, corresponding to sample times. Sample numbers $S_n$ operable to be used to identify specific samples are shown at the far left hand side.

Referring to FIGS. 5 and 11, since the viewing area on the display 16 has a radius of 480 pixels, for a depth range of interest of 40 m, 480 pixels are used to represent 40 m, or 40/480=0.0833 m/pixel, i.e. a depth per unit radius of 8.33 cm/pixel. Thus, a plurality of pixel-defined positions p may be marked on the time-amplitude representation as shown. For a given range of interest, the pixels on the display viewing area will generally represent amplitude at different times t than the times x associated with samples.

Knowing the sample number, the sample distance can be calculated and the pixel nearest the sample distance can be illuminated with the corresponding amplitude value. The nearest pixel may be found by using the sample distance and beam angle to find rectangular coordinates for the nearest pixel.

Thus, for pixel addressable displays, the processor simply steps through the set of amplitude values for a given beam angle, calculates the corresponding sample distance from the current sample number, finds the nearest pixel and uses the associated amplitude value to specify a pixel illumination intensity and/or color to illuminate the pixel.

By stepping through successive beam angles and for each beam angle stepping through the sets of amplitude values associated with each beam angle, the pixels along rays associated with beam angles are successively illuminated and the pixels along rays corresponding to successive beam angles illuminated, thereby creating an overall image, representing features that reflect sound in water. The process may be repeated several times per second for all the beam angles, thereby updating the overall image several times per second and providing a real-time image.

Figure 12:
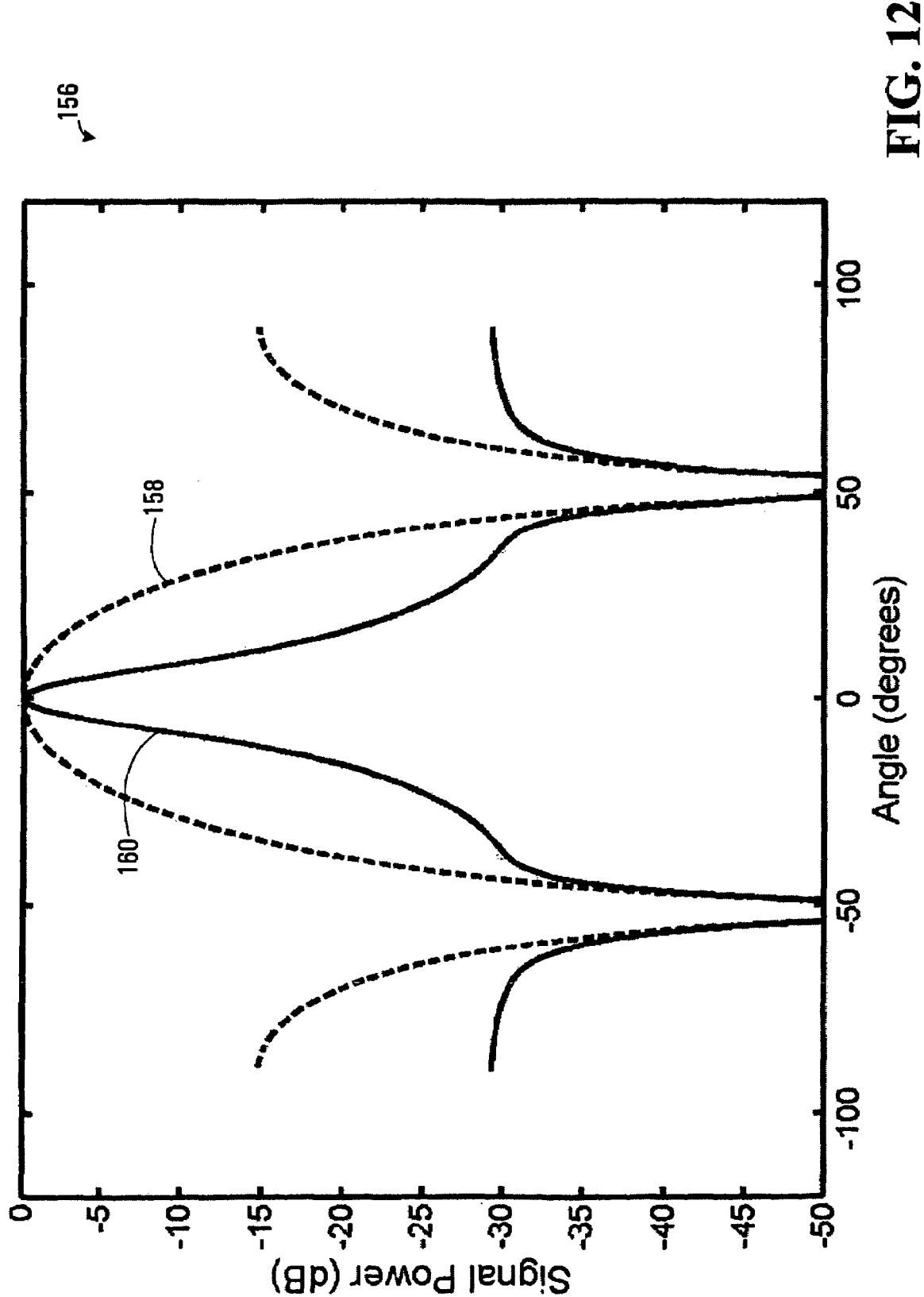
FIG. 12 is a graphical representation of a beam width, with and without a trigonometric expansion in the method shown in FIG. 8.

The trigonometric expansion conducted at block 206 in FIG. 7 and at block 114 in FIGS. 8 and 10B serves to sharpen the focus of the transducers to produce an effective beam width greater than would be achieved without trigonometric expansion. Referring to FIG. 12, representation of beam width with and without the trigonometric expansion is shown generally at 156. A trace 158, shown in broken outline, depicts beam width in a system of the type shown without the use of the trigonometric expansion step 114 shown in FIGS. 8 and 10B. In other words trace 158 shows beam width for a system in which the normalized composite values are simply scaled to produce the amplitude values used to illuminate pixels on the display.

A trace 160 depicts beam width when the trigonometric expansion step 114 is included in the process and shows a significant narrowing of beam width beginning at about 40 degrees off-center of the beam. The use of the trigonometric expansion step has the effect of causing the transducer array to act as though it were an array of a greater number of transducers. Increasing the degree of the trigonometric expansion greater than the $17^{th}$ order as in the embodiment described, has the effect of further focusing the beam, creating the effect of a greater number of transducers.

Thus, there is a clear advantage in using the trigonometric expansion step 114 to narrow the beam width, thereby facilitating greater resolution than would be provided by the physical transducers alone in the system.

Of particular importance in this invention is the accurate production of the delayed channel signals. The method described above involves the use of a Fourier Transform performed on time samples from a given transducer, followed by an inverse Fourier Transform, which accurately produces real and imaginary components of the channel signal for that transducer. These real and imaginary components are used in subsequent calculations and ultimately contribute to the production of the normalized composite values that are used in the trigonometric expansion. Without accurately produced real and imaginary components of the channel signals, such as would be the case with most analog systems, the signal to noise ratio of the channel signals and their components would begin to swamp the higher order terms of the trigonometric expansion, thereby diminishing the value of the higher order terms, rendering them useless and effectively limiting the benefit of the trigonometric expansion. By producing accurate delayed channel signals, such as by the Fourier Transform followed by the Inverse Fourier Transform, many more higher order terms are effective in the trigonometric expansion, resulting in greater focusing of the beam than could otherwise be achieved. Thus, an imaging system with greater accuracy than could otherwise be achieved with conventional components may be made available through the use of this invention.

While specific embodiments of the invention have been described and illustrated, such embodiments should be considered illustrative of the invention only and not as limiting the invention as construed in accordance with the accompanying claims.

What is claimed is:

1. A process for producing signals for controlling a display to produce an image in an imaging system employing a plurality of transducers, the process comprising:
   producing first and second beam signals in response to delayed channel signals associated with respective transducers, said delayed channel signals representing real and imaginary components of time domain signals associated with respective transducers suitably delayed to focus a receive beam pattern of the transducers at least one beam angle, each of said first and second beam signals including separate real and imaginary component representations;
   combining said real and imaginary components of said first and second beam signals, to produce a composite beam signal, said composite beam signal including separate real and imaginary component representations;
   performing a trigonometric expansion on normalized values of said real and imaginary component representations of said composite beam signal to produce a plurality of expanded values; and
   producing illumination signals in response to said expanded values, for illuminating pixels on the display.

2. The process of claim 1 further comprising receiving said delayed channel signals.

3. The process of claim 1 further comprising producing said delayed channel signals.

4. The process of claim 3 wherein producing said delayed channel signals comprises producing said delayed channel signals in response to channel signals and delay signals associated with said respective transducers,
   each channel signal representing a signal received at a corresponding transducer and including separate real and imaginary component representations; and
   said delay signals including separate cosine and sine delay components of a delay dependent on a desired beam angle at which said transducers are to be focused;
   each of said delayed channel signals including separate real and imaginary component representations.

5. The process of claim 4 further comprising receiving said channel signals.

6. The process of claim 4 further comprising producing said channel signals.

7. The process of claim 6 wherein producing said channel signals comprises producing frequency domain representations of respective time sampled representations of respective signals received at respective transducers and producing time domain representations of said respective signals in response to said frequency domain representations, said time domain representations comprising real and imaginary components.

8. The process of claim 4 further comprising receiving said delay signals.

9. The process of claim 8 further comprising receiving said channel signals and wherein said delay signals are received before said channel signals are received.

10. The process of claim 4 further comprising producing said delay signals.

11. The process of claim 10 further comprising receiving said channel signals and wherein said delay signals are produced before said channel signals are received.

12. The process of claim 10 wherein producing said delay signals comprises producing said delay signals in response to transducer spacing, angular frequency of wave energy received at said transducers, desired beam angle and speed of said wave energy in an area of a medium for which the image is to be produced.

13. The process of claim 1 further comprising producing a normalized composite beam signal comprising a plurality of normalized values, in response to said real and imaginary component representations of said composite beam signal and for each of said normalized values calculating a real part of the product of the first beam signal and the complex conjugate of the second beam signal.

14. The process of claim 13 wherein producing a normalized composite beam signal comprises scaling said real part of a product of the first beam signal and a complex conjugate of the second beam signal, by a magnitude value.

15. The process of claim 14 further comprising producing said magnitude value in response to said real and imaginary components of said first and second beam signals.

16. The process of claim 1 wherein performing a trigonometric expansion comprises performing a power expansion on each of said normalized values.

17. The process of claim 1 wherein performing a trigonometric expansion comprises performing a sum of Chebyshev polynomials on each of said normalized values.

18. The process of claim 1 further comprising illuminating pixels on the display in response to said illumination signals.

19. A process for producing signals for controlling a display to produce an image in an imaging system, the process comprising conducting the process of claim 1 for each of a plurality of beam angles to produce a set of illumination signals for each said beam angles.

20. The process of claim 19 further comprising defining said plurality of beam angles.

21. The process of claim 19 further comprising mapping respective sets of illumination values to respective rays of pixels on said display, each said ray corresponding to a respective beam angle, said illumination signals being operable to cause pixels along a given ray to be illuminated in response to corresponding illumination values.

22. A computer readable medium encoded with instructions for directing a processor to execute the process of claim 1.

23. A computer readable signal encoded with instructions for directing a processor to execute the process of claim 1.

24. An apparatus for producing signals for controlling a display to produce an image in an imaging system employing a plurality of transducers, the apparatus comprising:
  means for producing first and second beam signals in response to delayed channel signals associated with transducers, said delayed channel signals representing real and imaginary components of time domain signals associated with respective transducers suitably delayed to focus a receive beam pattern of the transducers at a beam angle, each of said first and second beam signals including separate real and imaginary component representations;
  means for combining said real and imaginary components of said first and second beam signals, to produce a composite beam signal, said composite beam signal including separate real and imaginary component representations;
  means for performing a trigonometric expansion on normalized values of said real and imaginary component representations of said composite beam signal to produce a plurality of expanded values; and
  means for producing illumination signals, in response to said expanded values, said illumination signals being operable to be received by said display for illuminating pixels on the display.

25. The apparatus of claim 24 further comprising means for receiving said delayed channel signals.

26. The apparatus of claim 24 further comprising means for producing said delayed channel signals.

27. The apparatus of claim 26 wherein said means for producing said delayed channel signals comprises means for producing said delayed channel signals in response to channel signals and delay signals associated with said transducers,
  each channel signal representing a signal received at a corresponding transducer and including separate real and imaginary component representations; and
  said delay signals including separate cosine and sine delay components of a delay dependent on a desired beam angle at which said transducers are to be focused;
  each of said delayed channel signals including separate real and imaginary component representations.

28. The apparatus of claim 27 further comprising means for receiving said channel signals.

29. The apparatus of claim 27 further comprising means for producing said channel signals.

30. The apparatus of claim 29 wherein said means for producing said channel signals comprises:
  means for producing frequency domain representations of respective time sampled representations of respective signals received at respective transducers; and
  means for producing time domain representations of said respective signals in response to said frequency domain representations,
  said time domain representations comprising real and imaginary components.

31. The apparatus of claim 27 further comprising means for receiving said delay signals.

32. The apparatus of claim 31 further comprising means for receiving said channel signals and wherein said delay signals are received before said channel signals are received.

33. The apparatus of claim 27 further comprising means for producing said delay signals.

34. The apparatus of claim 33 further comprising means for receiving said channel signals and wherein said delay signals are produced before said channel signals are received.

35. The apparatus of claim 33 wherein said means for producing said delay signals comprises means for producing said delay signals in response to transducer spacing, angular frequency of wave energy received at said transducers, desired beam angle and speed of said wave energy in an area of a medium for which the image is to be produced.

36. The apparatus of claim 24 further comprising means for producing a normalized composite beam signal comprising a plurality of normalized values in response to said real and imaginary component representations of said composite beam signal wherein said means for producing a normalized composite beam signal comprises means for, for each of said normalized values calculating a real part of the product of the first beam signal and a complex conjugate of the second beam signal.

37. The apparatus of claim 36 wherein said means for normalizing comprises means for scaling said real part of a product of the first beam signal and the complex conjugate of the second beam signal, by a magnitude value.

38. The apparatus of claim 37 further comprising means for producing said magnitude value in response to said real and imaginary components of said first and second beam signals.

39. The apparatus of claim 24 wherein said means for performing a trigonometric expansion comprises means for performing a power expansion on each of said normalized values.

40. The apparatus of claim 24 wherein said means for performing a trigonometric expansion comprises means for performing a sum of Chebyshev polynomials on each of said normalized values.

41. The apparatus of claim 24 further comprising means for illuminating pixels on the display in response to said expanded values.

42. The apparatus of claim 24 further comprising means for causing said apparatus to produce a set of illumination signals for a plurality of said beam angles.

43. The apparatus of claim 42 further comprising means for defining said plurality of beam angles.

44. The apparatus of claim 42 further comprising means for mapping respective sets of illumination values to respective rays of pixels on said display, each said ray corresponding to a respective beam angle, said illumination signals being operable to cause pixels along a given ray to be illuminated in response to corresponding illumination values.

45. An apparatus for producing signals for controlling a display to produce an image in an imaging system employing a plurality of transducers, the apparatus comprising:
   memory for storing delayed channel signals associated with respective transducers, said delayed channel signals representing real and imaginary components of time domain signals associated with respective transducers suitably delayed to focus a receive beam pattern of the transducers at a beam angle;
   a processor in communication with said memory and operably configured to:
   produce first and second beam signals in response to said delayed channel signals, each of said first and second beam signals including separate real and imaginary component representations;
   combine said real and imaginary components of said first and second beam signals, to produce a composite beam signal, said composite beam signal including separate real and imaginary component representations;
   perform a trigonometric expansion on normalized values of said real and imaginary component representations of said composite beam signal produce a plurality of expanded values; and
   produce illumination signals in response to said expanded values, for use by the display, for illuminating pixels on the display.

46. The apparatus of claim 45 further comprising an input operably coupled to said processor for receiving said delayed channel signals.

47. The apparatus of claim 45 wherein said processor is operably configured to produce said delayed channel signals.

48. The apparatus of claim 47 further comprising memory for storing channel signals and delay signals associated with said respective transducers, each channel signal representing a signal received at a corresponding transducer and including separate real and imaginary component representations, and said delay signals including separate cosine and sine delay components of a delay dependent on a desired beam angle at which said transducers are to be focused; and
   wherein said processor is operably configured to produce said delayed channel signals in response to said channel signals and delay signals, each of said delayed channel signals including separate real and imaginary component representations.

49. The apparatus of claim 48 further comprising input coupled to said processor for receiving said channel signals.

50. The apparatus of claim 48 wherein said processor is operably configured to produce said channel signals.

51. The apparatus of claim 50 further comprising an input operably coupled to said processor to enable said processor to receive and store in said memory respective time sampled representations of respective signals received at respective transducers; and
   wherein said processor is operably configured to produce said channel signals by producing frequency domain representations of respective said time sampled representations of respective signals received at respective transducers and to produce time domain representations of said respective signals in response to said frequency domain representations, said time domain representations comprising real and imaginary components.

52. The apparatus of claim 48 further comprising an input operably coupled to said processor to enable said processor to receive and store in said memory said delay signals.

53. The apparatus of claim 52 further comprising an input operably coupled to said processor to enable said processor to receive said channel signals and wherein said delay signals are received before said channel signals are received.

54. The apparatus of claim 48 wherein said processor is operably configured to produce said delay signals.

55. The apparatus of claim 54 further comprising an input operably coupled to said processor for receiving said channel signals and wherein said processor is operably configured to produce said delay signals before said channel signals are received.

56. The apparatus of claim 54 further comprising memory for storing representations of transducer spacing, angular frequency of wave energy received at said transducers, desired beam angle and speed of said wave energy in an area of a medium for which the image is to be produced, and wherein said processor is operably configured to produce said delay signals in response to said representations of transducer spacing, angular frequency of wave energy received at said transducers, desired beam angle and speed of said wave energy in an area of a medium for which the image is to be produced.

57. The apparatus of claim 45 wherein said processor is operably configured to produce a normalized composite beam signal comprising a plurality of normalized values in response to said real and imaginary component representations of said composite beam signal and for each of said normalized values, calculating a real part of a product of the first beam signal and a complex conjugate of the second beam signal.

58. The apparatus of claim 57 wherein said processor is operably configured to scale said real part of the product of the first beam signal and the complex conjugate of the second beam signal, by a magnitude value.

59. The apparatus of claim 58 wherein said processor is operably configured to produce said magnitude value in response to said real and imaginary components of said first and second beam signals.

60. The apparatus of claim 45 wherein said processor is operably configured to perform said trigonometric expansion by performing a power expansion on each of said normalized values.

61. The apparatus of claim 45 wherein said processor is operably configured to perform said trigonometric expansion by performing a sum of Chebyshev polynomials on each of said normalized values.

62. The apparatus of claim 45 wherein said processor is operably configured to produce illumination signals operable to be received by a display.

63. The apparatus of claim 45 wherein said processor is operably configured to, for each of a plurality of beam angles, produce a set of illumination signals for each said beam angle.

64. The apparatus of claim 63 wherein said processor is operably configured to define said plurality of beam angles.

65. The apparatus of claim 63 wherein said processor is operably configured to map respective sets of illumination values to respective rays of pixels on said display, each said ray corresponding to a respective beam angle, said illumination signals being operable to cause pixels along a given ray to be illuminated in response to corresponding illumination values.

* * * * *

UNITED STATES PATENT AND TRADEMARK OFFICE
CERTIFICATE OF CORRECTION

| | | |
|---|---|---|
| PATENT NO. | : 7,450,470 B2 | Page 1 of 1 |
| APPLICATION NO. | : 11/034628 | |
| DATED | : November 11, 2008 | |
| INVENTOR(S) | : Douglas James Wilson | |

It is certified that error appears in the above-identified patent and that said Letters Patent is hereby corrected as shown below:

Col. 20, Claim 1, line 9, delete "at" and insert --at at-- therefor.

Col. 23, Claim 45, line 40, insert --to-- between "signal" and "produce".

Signed and Sealed this

First Day of December, 2009

David J. Kappos
*Director of the United States Patent and Trademark Office*